United States Patent
Ohta et al.

(10) Patent No.: US 9,462,546 B2
(45) Date of Patent: Oct. 4, 2016

(54) MOBILE STATION, BASE STATION, WIRELESS COMMUNICATION SYSTEM, AND WIRELESS COMMUNICATION METHOD

(71) Applicant: FUJITSU LIMITED, Kawasaki-shi, Kanagawa (JP)

(72) Inventors: Yoshiaki Ohta, Yokohama (JP); Yoshinori Tanaka, Yokohama (JP); Yoshiharu Tajima, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 601 days.

(21) Appl. No.: 13/923,916

(22) Filed: Jun. 21, 2013

(65) Prior Publication Data
US 2013/0279390 A1   Oct. 24, 2013

Related U.S. Application Data

(63) Continuation of application No. PCT/JP2010/073217, filed on Dec. 22, 2010.

(51) Int. Cl.
*H04W 52/02* (2009.01)
*H04W 76/04* (2009.01)
*H04W 72/04* (2009.01)

(52) U.S. Cl.
CPC ..... *H04W 52/0209* (2013.01); *H04W 52/0229* (2013.01); *H04W 72/04* (2013.01); *H04W 76/048* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,903,595 | B2 | 3/2011 | Choi et al. |
| 8,284,707 | B2 | 10/2012 | Choi et al. |
| 2009/0257387 | A1 | 10/2009 | Gholmieh et al. |
| 2010/0046451 | A1 | 2/2010 | Tada et al. |
| 2010/0130137 | A1 | 5/2010 | Pelletier et al. |
| 2010/0130219 | A1 | 5/2010 | Cave et al. |
| 2011/0134774 | A1* | 6/2011 | Pelletier ............. H04W 52/365 370/252 |

FOREIGN PATENT DOCUMENTS

| | | |
|---|---|---|
| JP | 2005-260987 A | 9/2005 |
| JP | 2009-502085 A | 1/2009 |
| JP | 2010-509846 A | 3/2010 |

(Continued)

OTHER PUBLICATIONS

Panasonic, "Scheduling aspects for carrier aggregation," 3GPP TSG RAN WG2 #68bis R2-100231, Jan. 18-22, 2010, chapter 2.1.

(Continued)

*Primary Examiner* — Anh Ngoc Nguyen
*Assistant Examiner* — Adam Duda
(74) *Attorney, Agent, or Firm* — Arent Fox LLP

(57) ABSTRACT

A mobile station that performs wireless communication by using a plurality of wireless carriers, the mobile station includes a transmission managing unit that detects a transmission timing of communication data of a predetermined wireless carrier, and a state managing unit that makes the predetermined wireless carrier an activated state when the transmission managing unit detects the transmission timing of the communication data, and makes the predetermined wireless carrier a deactivated state after the communication data is transmitted and received.

8 Claims, 35 Drawing Sheets

(56) References Cited

FOREIGN PATENT DOCUMENTS

| JP | 2010-246168 A | 10/2010 |
|---|---|---|
| WO | WO 2008/096527 A1 | 8/2008 |

OTHER PUBLICATIONS

"Requirements for support of radio resource management," 3GPP TS 36.133, Version 9.4.0., Release 9, p. 37-84, Jul. 2010.
Ericsson, ST-Ericsson, "Summary of the email discussion [68#23] LTE: CC activation / deactivation," 3GPP TSG-RAN WG2 #68bis Tdoc R2-100079, Jan. 18-22, 2010, chapters 3.2.3, 3.2.4.
International Search Report, PCT/JP2010/073217 dated Feb. 8, 2011.
Panasonic, "Scheduling aspects for carrier aggregation," 3GPP TSG RAN WG2 #68bis R2-100321, Jan. 18-22, chapter 2.1.
Pantech, "Considerations on activation with common DRX," 3GPP TSG RAN WG2 Meeting #69 R2-101111, Feb. 22-26, 2010, chapter 2.
Chinese Office Action for Chinese Application No. 201080070836.9.
HTC, "Implicit release for SPS," 3GPP TSG-RAN WG2 #71, R2-104310, Aug. 23-27, 2010.
Japanese Office Action, Japanese Patent Application No. 2012-549536 dated Mar. 11, 2014.
Nokia Corporation, Nokia Siemens Networks, "Uplink Activation & Deactivation of SCells," 3GPP TSG-RAN WG2 Meeting #71, R2-104819, Aug. 23-27, 2010.
Nokia Siemens Networks, Nokia Corporation, "Semi-Persistent Scheduling in Carrier Aggregation," 3GPP TSG-RAN WG2 Meeting #69bis, R2-101987, Apr. 12-16, 2010.
ZTE, "DRX and activation/deactivation," 3GPP TSG RAN WG2 #69bis, R2-102177, Apr. 12-16, 2010.
Chinese Office Action for Chinese Application No. 201080070836.9 dated Jul. 13, 2015.
3GPP TSG-RAN WSG #68bis, Tdoc R2-100079, "Summary of the email discussion [68#23] LTE: CC activation/deactivation", Ericsson, ST-Ericsson, Valencia, Spain, Jan. 18-22, 2010, pp. 1-17.
3GPP TSG-RAN WG2 #68bis, R2-100231, "Scheduling aspects for carrier aggregation", Panasonic, Valencia, Spain, Jan. 18-22. 2010.
Extended European Search Report of European Patent Application No. 10861050.2 dated Apr. 25, 2016.

\* cited by examiner

MOBILE STATION, BASE STATION, WIRELESS COMMUNICATION SYSTEM, AND WIRELESS COMMUNICATION METHOD

CROSS-REFERENCE TO RELATED APPLICATION

This application is a continuation of International Application No. PCT/JP2010/073217, filed on Dec. 22, 2010 and designating the U.S., the entire contents of which are incorporated herein by reference.

FIELD

The embodiments discussed herein are related to a wireless communication system capable of communication using a plurality of frequency carriers.

BACKGROUND

In a conventional wireless communication system, a technology called DRX (Discontinuous Reception) has been adopted as an example of a technology for realizing low power consumption.

DRX is a technology for realizing a power saving mode of a mobile station. Specifically, an interval involving monitoring of a PDCCH (Physical Downlink Control Channel) that controls data transmission and reception and an interval that does not involve the monitoring are defined to realize low power consumption of the mobile station. Periodic repetition of the intervals is called a DRX cycle. The mobile station does not perform signal processing, such as data processing, in the interval in which nothing is received by the PDCCH, and therefore enters the power saving mode. For example, signal processing in a baseband unit of the mobile station is temporarily suspended. However, it is difficult to completely stop the baseband unit during the power saving mode. Certain specifications, such as radio measurements, are defined even in the power saving mode; therefore, the mobile station performs minimum signal processing to comply with the specifications. The DRX cycle is configured when a base station notifies the mobile station by RRC (Radio Resource Control) at the start of communication.

A case will be explained below that DRX is performed in carrier aggregation based on LTE (Long Term Evolution) Rel-10.

First, a case (first conventional technology) will be explained below that the mobile station controls DRX in an SCell (Secondary Cell) in conjunction with the DRX cycle configuration in a PCell (Primary Cell). For example, when the PCell performs a large amount of data communication and the SCell performs SPS (Semi-persistent Scheduling) communication, an interval that does not involve the monitoring of a PDCCH is configured as a power saving mode in the PCell. In the SCell, because the SCell operates in conjunction with the DRX cycle configuration in the PCell, the same interval of the power saving mode as that of the PCell is set.

Next, a case (second conventional technology) will be explained below that DRX is individually controlled for each of component carries in the carrier aggregation. In this case, DRX in the PCell is controlled according to a traffic pattern of the PCell, and DRX in the SCell is controlled according to a traffic pattern of the SCell. Namely, an interval of the power saving mode is individually set in the PCell and the SCell. As to the examples of conventional technologies, see 3GPP TS 36.133, "Requirements for support of radio resource management", V 9.4.0, Release 9, June 2010, for example.

However, in the first conventional technology, because the interval of the power saving mode in the SCell is set in conjunction with the PCell, if the PCell is in the interval of the power saving mode, even when the SCell does not perform SPS communication, the mobile station is caused to monitor a PDCCH. Therefore, there is a problem that electric power is wasted.

Furthermore, in the second conventional technology, because certain specifications, such as wireless measurements, are defined even in the power saving mode, minimum signal processing is performed to comply with the specifications. Therefore, there is a problem that the SCell is caused to monitor a PDCCH and a PDSCH even when DRX is individually controlled for each of the carriers.

SUMMARY

According to an aspect of an embodiment of the present invention, a mobile station performs wireless communication by using a plurality of wireless carriers. The mobile station includes a transmission managing unit that detects a transmission timing of communication data of a predetermined wireless carrier, and a state managing unit that makes the predetermined wireless carrier an activated state when the transmission managing unit detects the transmission timing of the communication data, and makes the predetermined wireless carrier a deactivated state after the communication data is transmitted and received.

According to another aspect of an embodiment of the present invention, a base station performs wireless communication by using a plurality of wireless carriers. The base station includes a transmission managing unit that detects a transmission timing of communication data of a predetermined wireless carrier, and a state managing unit that makes the predetermined wireless carrier an activated state when the transmission managing unit detects the transmission timing of the communication data, and makes the predetermined wireless carrier a deactivated state after the communication data is transmitted and received.

According to still another aspect of an embodiment of the present invention, a wireless communication system performs wireless communication by using a plurality of wireless carriers. The wireless communication system includes a mobile station, and a base station. Each of the mobile station and the base station includes a transmission managing unit that detects a transmission timing of communication data of a predetermined wireless carrier, and a state managing unit that makes the predetermined wireless carrier an activated state when the transmission managing unit detects the transmission timing of the communication data, and makes the predetermined wireless carrier a deactivated state after the communication data is transmitted and received.

According to still another aspect of an embodiment of the present invention, a wireless communication method implemented by a wireless communication system that performs wireless communication by using a plurality of wireless carriers, the wireless communication method includes detecting, by each of a mobile station and a base station of the wireless communication system, a transmission timing of communication data of a predetermined wireless carrier, making, by each of the mobile station and the base station, the predetermined wireless carrier an activated state when the transmission timing of the communication data is detected, and making, by each of the mobile station and the base station, the predetermined wireless carrier a deactivated state after the communication data is transmitted.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited by the embodiments.

[a] First Embodiment

Figure 1:
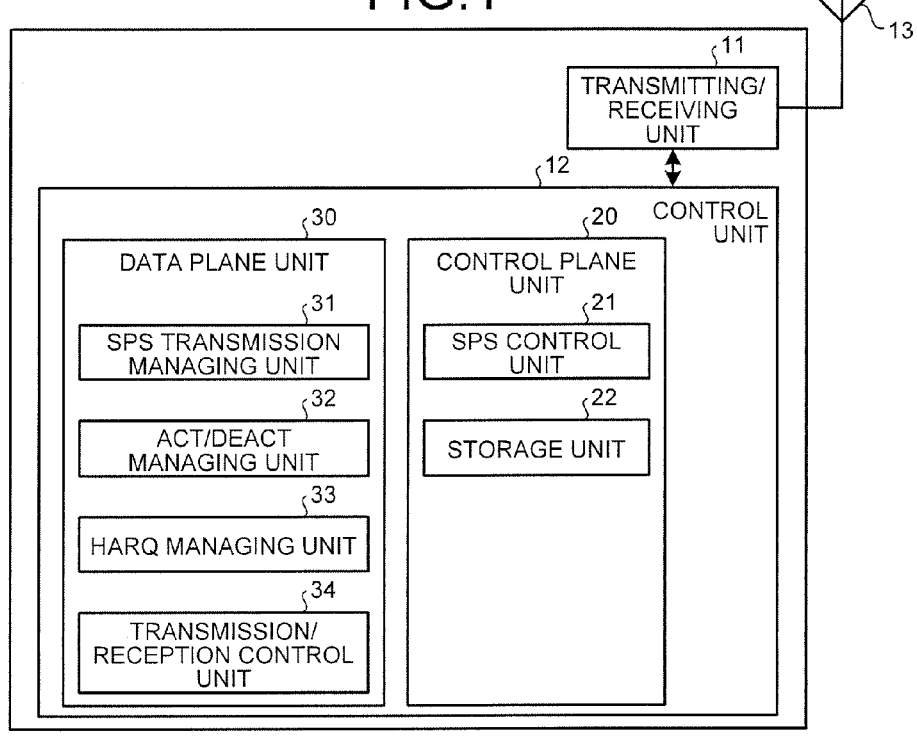
FIG. 1 is a diagram illustrating a configuration example of a mobile station in a wireless communication system.
Figure 2:
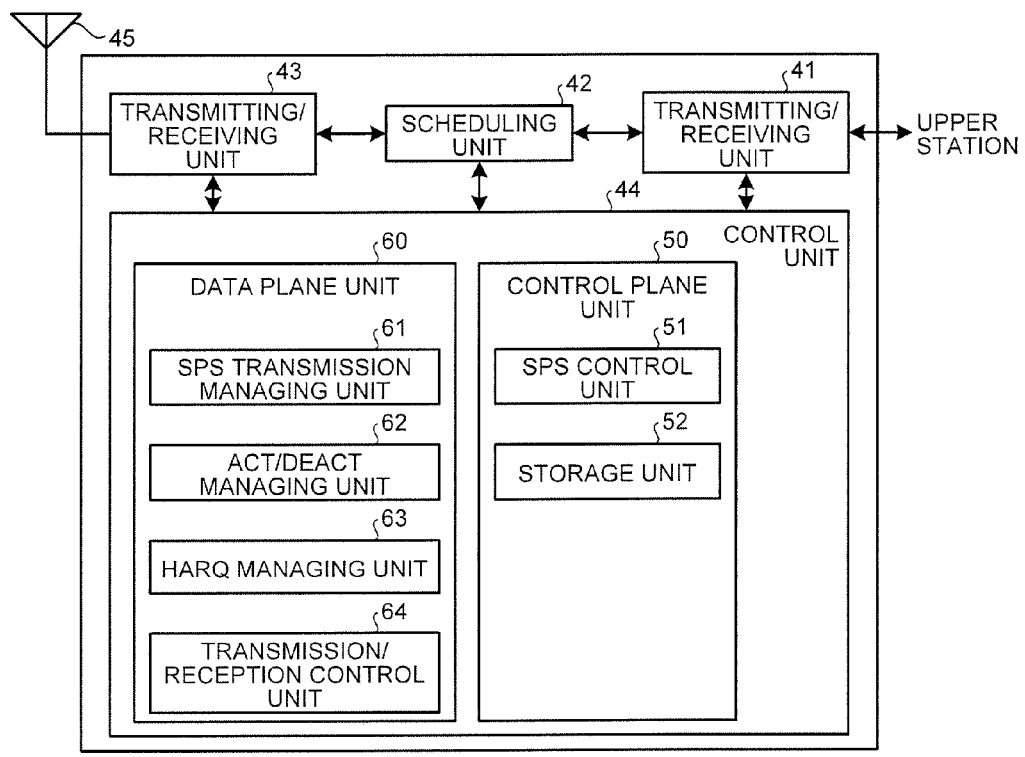
FIG. 2 is a diagram illustrating a configuration example of a base station in the wireless communication system.

FIG. 1 is a diagram illustrating a configuration example of a mobile station in a wireless communication system. FIG. 2 is a diagram illustrating a configuration example of a base station in the wireless communication system.

In FIG. 1, the mobile station (UE) includes a transmitting/receiving unit 11, a control unit 12 including a control plane unit 20 and a data plane unit 30, and an antenna 13. The transmitting/receiving unit 11 transmits and receives signals transmitted by radio via the antenna 13.

The control plane unit 20 of the control unit 12 is an RRC layer and controls all of layers. In particular, the control plane unit 20 includes an SPS control unit 21 and a storage unit 22. The SPS control unit 21 controls the entire communication including allocation of an SPS resource or the like. The storage unit 22 stores therein an Activation (activated)/Deactivation (deactivated) state of an SCell or the like.

The data plane unit 30 of the control unit 12 controls a PHY (Physical) layer, a MAC (Media Access Control) layer, an RLC (Radio Link Control) layer, and a PDCP (Packet Data Convergence Protocol) layer. In particular, the data plane unit 30 includes an SPS transmission managing unit 31, an ACT/DEACT managing unit 32, a HARQ (Hybrid Automatic Repeat Request) managing unit 33, and a transmission/reception control unit 34. The SPS transmission managing unit 31 manages a transmission timing of SPS data. The ACT/DEACT managing unit 32 manages Activation/Deactivation of an SCell. The HARQ managing unit 33 manages HARQ. The transmission/reception control unit 34 controls transmission/reception of data, acknowledgement (ACK/NACK), or the like.

Meanwhile, in FIG. 2, the base station (eNB) includes a transmitting/receiving unit 41, a scheduling unit 42, a transmitting/receiving unit 43, a control unit 44 including a control plane unit 50 and a data plane unit 60, and an antenna 45. The transmitting/receiving unit 41 transmits and receives data to and from an upper station. The scheduling unit 42 performs scheduling of wireless transmission. The transmitting/receiving unit 43 transmits and receives signal transmitted by radio via the antenna 45.

The control plane unit 50 of the control unit 44 is an RRC layer and controls all of layers. In particular, the control plane unit 50 includes an SPS control unit 51 and a storage unit 52. The SPS control unit 51 controls the entire communication including allocation of an SPS resource or the like. The storage unit 52 stores therein a state of Activation/ Deactivation of an SCell or the like.

The data plane unit 60 of the control unit 44 controls a PHY layer, a MAC layer, an RLC layer, and a PDCP layer. In particular, the data plane unit 60 includes an SPS transmission managing unit 61, an ACT/DEACT managing unit 62, a HARQ managing unit 63, and a transmission/reception control unit 64. The SPS transmission managing unit 61 manages a transmission timing of SPS data. The ACT/DEACT managing unit 62 manages Activation/Deactivation of an SCell. The HARQ managing unit 63 manages HARQ. The transmission/reception control unit 64 controls transmission and reception of data, acknowledgement, or the like.

In the present embodiment, a wireless communication method performed by the wireless communication system including the mobile station and the base station will be explained by way of example. However, the present invention is not limited to this example. For example, the wireless communication method of the present embodiment can be applied to a system including a relay station and a base station or to a system including a mobile station and a relay station, in the same manner as above. In the configuration examples of the mobile station and the base station as described above, only components related to processes of the present embodiment are illustrated for convenience of explanation, and not all of the functions of the mobile station and the base station are illustrated. Furthermore, the functional units of the mobile station and the base station may be configured by, for example, a CPU (Central Processing Unit), an FPGA (Field Programmable Gate Array), a memory, or the like.

A system and a wireless communication method that are a basis of the wireless communication method performed by the wireless communication system of the present embodiment will be explained below before explanation of the present embodiment.

LTE, which is a new-generation mobile communication system, defines a scheme based on OFDM (Orthogonal Frequency Division Multiplexing) as a radio access technology. LTE enables high-speed wireless packet communication at the downlink peak data rate of at least 100 Mb/s and the uplink peak data rate of at least 50 Mb/s. 3GPP (3rd Generation Partnership Project), which is an international standardization organization, has already started studying an LTE-based mobile communication system LTE-A (LTE-Advanced), in its efforts to bring about even faster communication. The aim of LTE-A is to enhance the downlink peak data rate to 1 Gb/s and the uplink peak data rate to 500 Mb/s, and various new technologies, such as a radio access scheme and a network architecture, have been studied.

Figure 3:
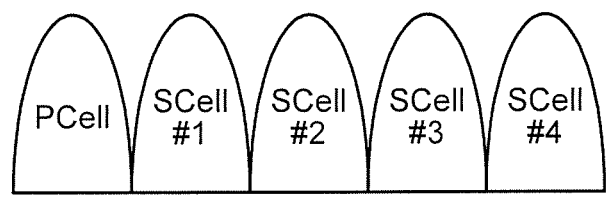
FIG. 3 is a diagram illustrating carrier aggregation.

In LTE-A (or LTE Rel-10), as a method to realize high-speed communication, a wireless communication method has been studied, in which a plurality of wireless carriers of an LTE system are aggregated and the aggregated bandwidth is used to transmit a large volume of data. This is called carrier aggregation (frequency aggregation). FIG. 3 is a diagram illustrating the carrier aggregation. In FIG. 3, each of aggregated LTE wireless carriers is called a component carrier (Component Carrier). A cell that executes various types of important control (transmission of uplink control data) in the carrier aggregation is called a PCell. The other aggregated cells (#1 to #4) are called SCells, which are additional carries for improving throughput. In LTE-A or the like, for example, the mobile station (UE) and the base station (eNB) transmit and receive data by using a plurality of the component carriers.

As a technology that is a basis for the wireless communication method of the present embodiment, LTE-A defines two types of scheduling methods, one of which is called "Dynamic Scheduling" and the other is called "Semi-persistent Scheduling (SPS)".

Figure 4:
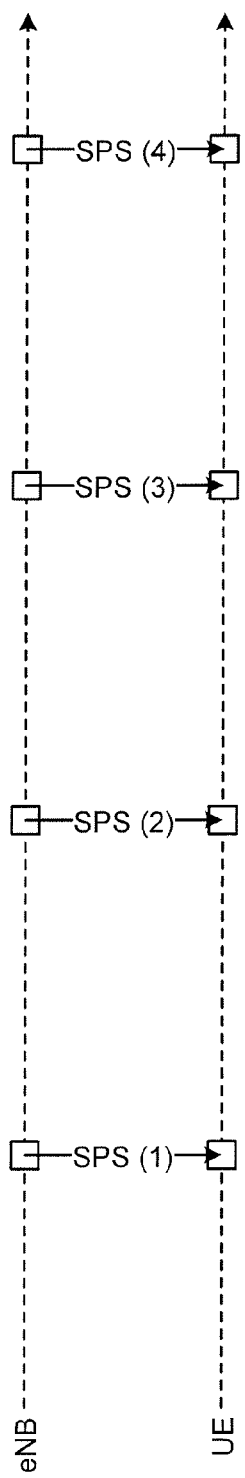
FIG. 4 is a diagram illustrating an example of SPS.

SPS is a scheduling method used in real-time communication represented by VoIP (Voice over Internet Protocol) or the like. FIG. 4 is a diagram illustrating an example of SPS. In SPS, a radio parameter is fixedly assigned to a defined period (corresponding to SPS (1), (2), (3), (4) . . . ) in advance of execution of communication. This assignment is set by, for example, RRC (RRC Connection Reconfiguration) in a higher-level layer (corresponding to an "SPS configuration" to be described later). For example, in VoIP communication, initial transmission of data occurs at every 20 ms. Therefore, the base station notifies, in advance, the mobile station of what radio parameter is to be used at every 20 ms. When the SPS communication is actually performed, the base station transmits an SPS Activation command to the mobile station by a PDCCH to notify a radio resource to be subsequently used. In this way, in SPS, a radio parameter and a radio resource are assigned in advance, so that it becomes possible to periodically transmit SPS data with a small packet size without sending a control signal (PDCCH). Therefore, it is possible to reduce a signaling overhead.

When the SPS communication is completed, the base station transmits an SPS Deactivation command to the mobile station (uplink and downlink) by a PDCCH. In uplink SPS, the mobile station may perform empty transmission a predetermined number of times specified by a parameter called implicitReleaseAfter, instead of transmitting the Deactivation command. Accordingly, the SPS communication can be stopped.

When data is re-transmitted, "Dynamic Scheduling" is used. In "Dynamic Scheduling", a radio resource to be used is specified by a PDCCH in both of uplink and downlink communication. In the carrier aggregation based on LTE Rel-10, SPS is executed by the PCell for simplifying control. The SPS communication can be executed by "Dynamic Scheduling". For example, the base station performs "Dynamic Scheduling" at every 20 ms. However, if "Dynamic Scheduling" is performed, a signaling overhead increases.

Figure 5:
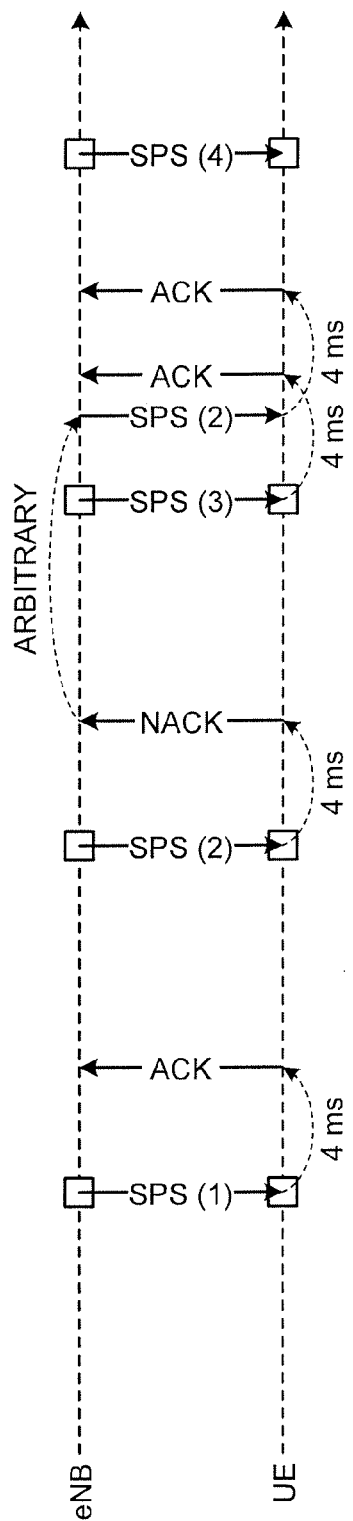
FIG. 5 is a diagram illustrating an example of HARQ.
Figure 6:
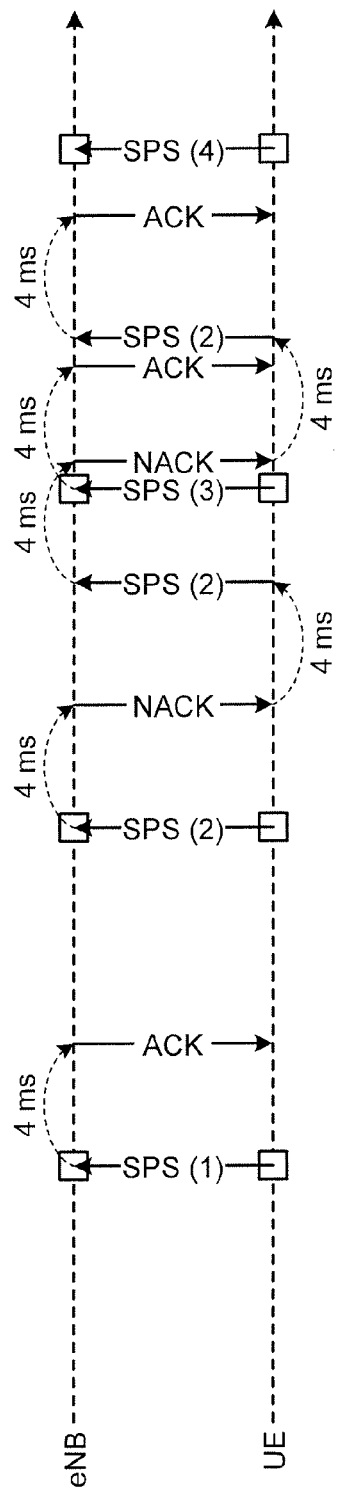
FIG. 6 is a diagram illustrating an example of HARQ.

As a technology that is a basis for the wireless communication method of the present embodiment, a method to control HARQ is explained below. FIG. 5 and FIG. 6 are diagrams illustrating an example of HARQ. Specifically, FIG. 5 illustrates downlink HARQ and FIG. 6 illustrates uplink HARQ. For example, in LTE, an "Asynchronous HARQ" scheme is adopted for downlink communication and a "Synchronous HARQ" scheme is adopted for uplink communication. In "Asynchronous HARQ", the base station receives acknowledgement for downlink transmission after a lapse of 4 ms. When the acknowledgement is NACK, the base station performs downlink retransmission at an arbitrary timing. In this case, the base station notifies the data transmission to the mobile station by a PDCCH.

Incidentally, in "Synchronous HARQ", the mobile station receives acknowledgement for uplink transmission after a lapse of 4 ms. For example, when the acknowledgement is NACK, the mobile station performs uplink transmission after a further lapse of 4 ms. In this way, in "Synchronous HARQ", because the uplink transmission and the acknowledgement are performed at every 4 ms, a notification of the data transmission is not sent by a PDCCH. Namely, the mobile station can autonomously re-transmits data after a lapse of 4 ms since reception of NACK without receiving a PDCCH. Therefore, it is possible to reduce a signaling overhead due to a PDCCH.

Figure 7:
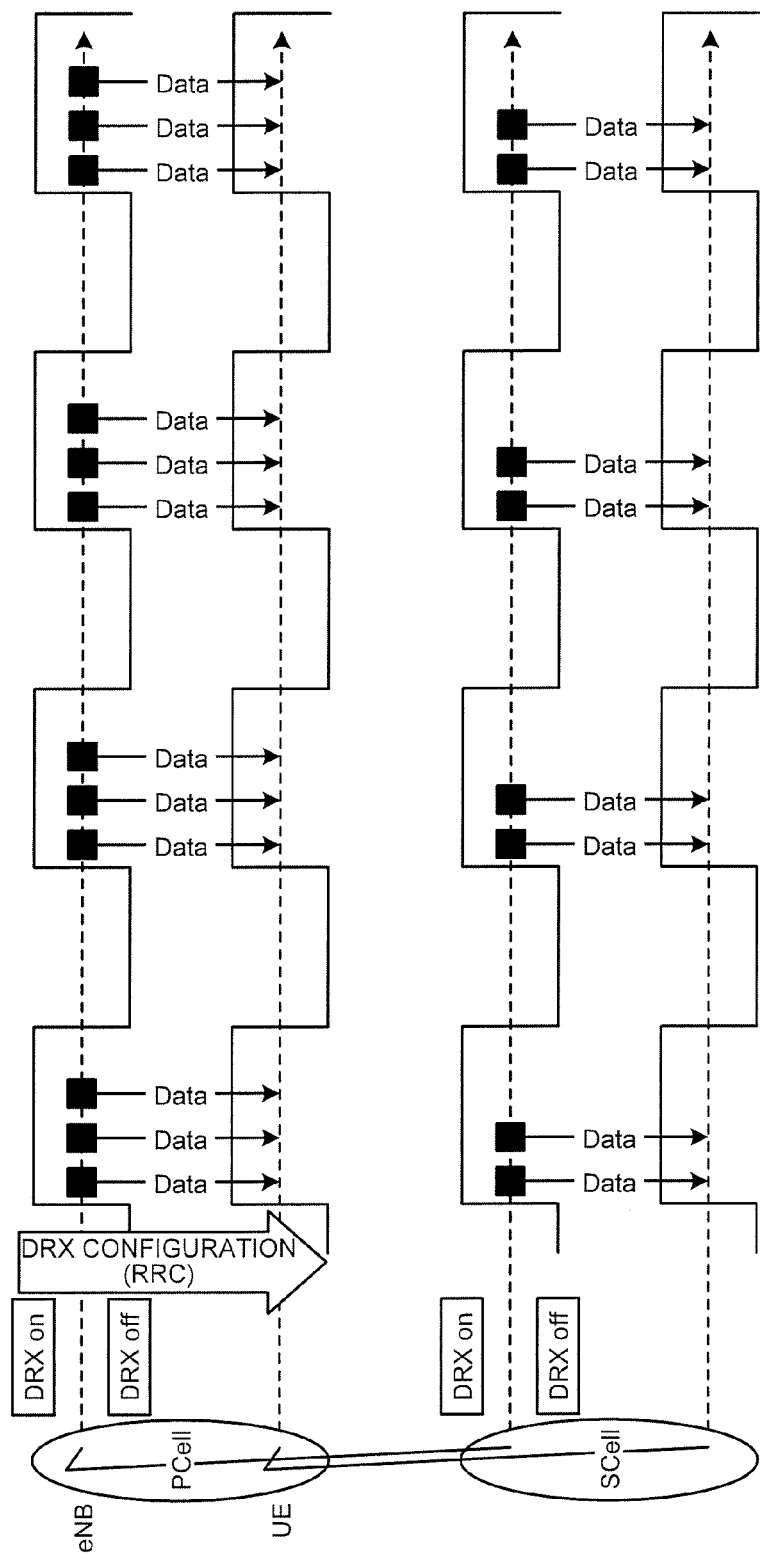
FIG. 7 is a diagram illustrating an example of DRX.

As a technology that is a basis for the wireless communication method of the present embodiment, DRX is explained below. FIG. 7 is a diagram illustrating an example of DRX. DRX is a method to implement a power saving mode of the mobile station. Specifically, an interval that involves monitoring of a PDCCH being an L1 signal for controlling data transmission/reception of the mobile station (DRXon duration) and an interval that does not involve the monitoring (DRXoff duration) are defined (a DRX cycle). The mobile station does not perform signal processing, such as data processing, in an interval in which nothing is received by the PDCCH, so that the mobile station enters a power saving mode (enter DRXoff). For example, the signal processing performed by a baseband unit of the mobile station is temporarily suspended. However, it is impossible to completely stop the baseband unit during the DRXoff duration (during the power saving mode). For example, certain specifications, such as radio measurements, are defined even in the power saving mode (for example, a measurement of the same frequency or a measurement of a different frequency), and the mobile station performs minimum signal processing to comply with the specifications. The DRX cycle is configured when the base station sends a parameter or the like to the mobile station by using an L3 signal (RRC) (the DRX configuration in FIG. 7) at the start of communication.

In LTE Rel-10, the DRX of each of the component carriers is controlled for each mobile station, rather than for each component carrier. Therefore, the mobile station controls DRX of the SCell by referring to the DRX cycle configuration in the PCell (see the DRX cycle of the SCell in FIG. 7).

Figure 8:
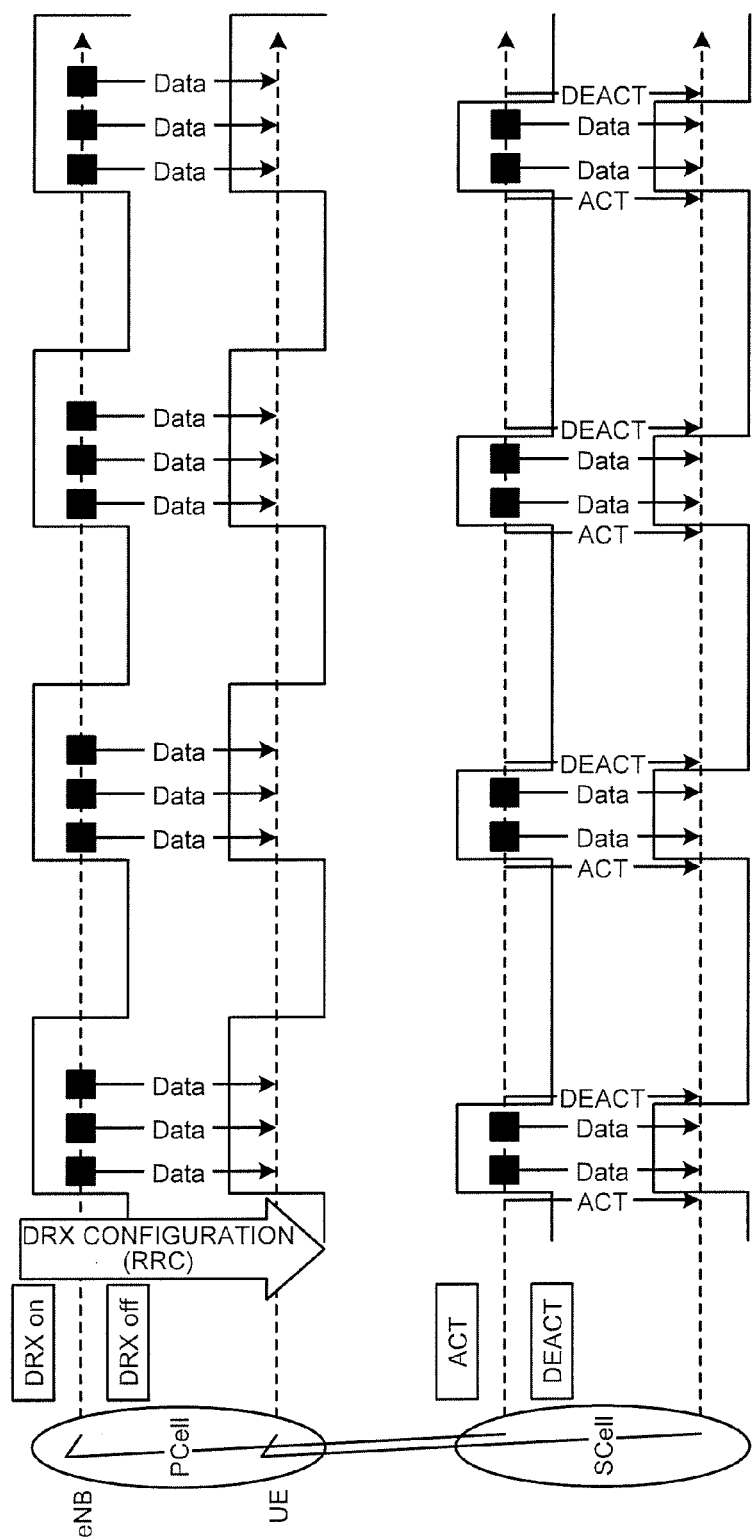
FIG. 8 is a diagram illustrating an example of Activation/Deactivation.

As a technology that is a basis for the wireless communication method of the present embodiment, Activation (active state)/Deactivation (inactive state) is explained below. This technology is a method to implement the power saving mode of the mobile station similarly to the above. FIG. 8 is a diagram illustrating an example of Activation/Deactivation. A difference from DRX lies in that Activation/Deactivation is individually applied to the SCells and the base station appropriately sends a notification to the mobile station by an L2 signal (MAC: Media Access Control). Namely, at the time of Activation of an SCell, the base station explicitly transmits a command (ACT in FIG. 8) to the mobile station, and, at the time of Deactivation of an SCell, the base station explicitly transmits a command (DEACT in FIG. 8) to the mobile station. Furthermore, the definition of Activation/Deactivation differs from DRX. Activation is defined as an interval involving the monitoring of a PDCCH and buffering of a PDSCH (Physical Downlink Shared Channel). On the other hand, Deactivation is defined as an interval that does not involve the monitoring of a PDCCH and the buffering of a PDSCH. Therefore, during Deactivation, the mobile station does not perform monitoring of a PDCCH and buffering of a PDSCH. Therefore, it is possible to further save electric power compared with DRX.

Figure 9:
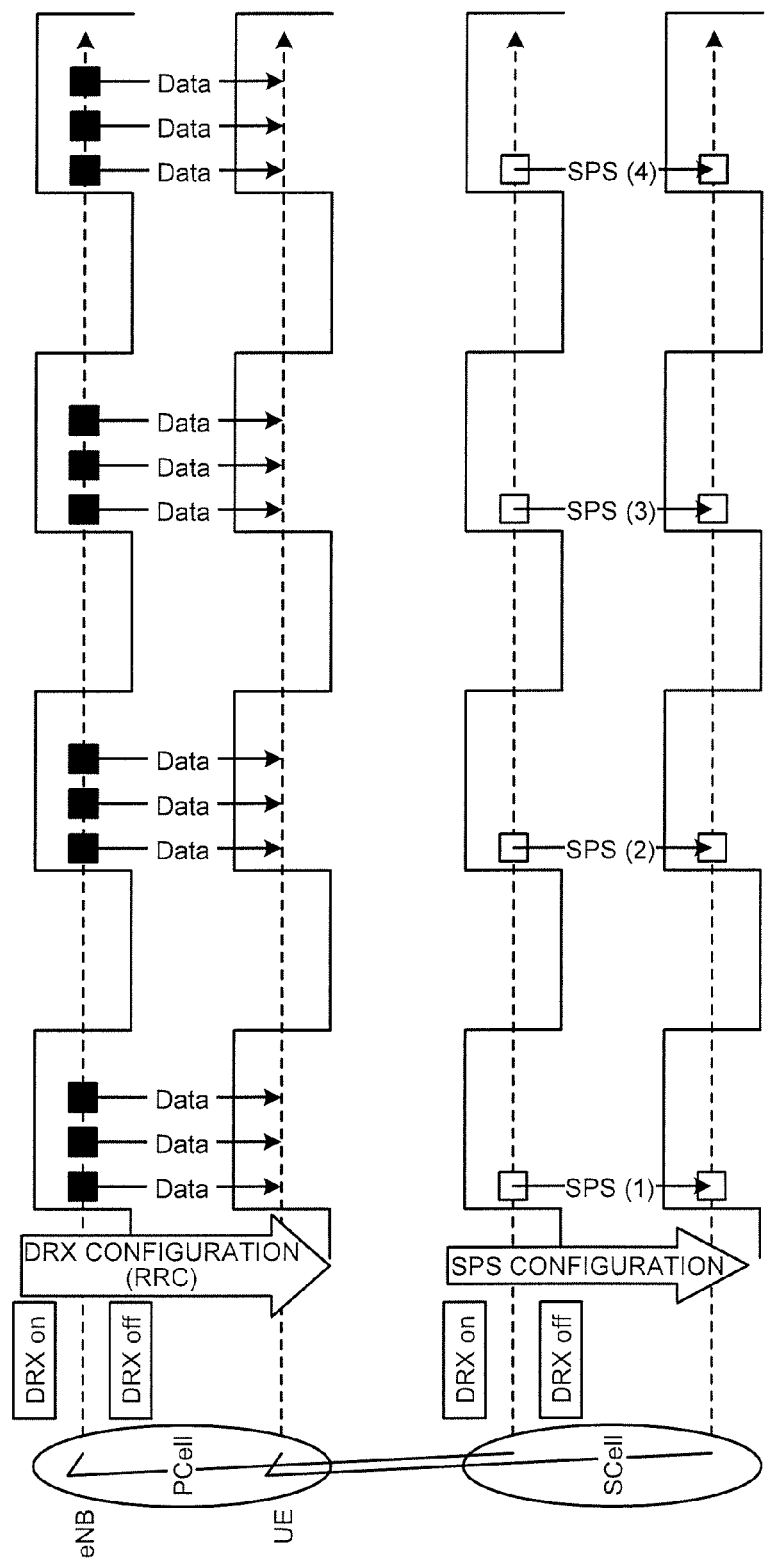
FIG. 9 is a diagram illustrating an example of a case that an SCell performs SPS communication.

A problem with the technologies that are the basis of the wireless communication method of the present embodiment will be explained below. As described above, the SPS communication in the carrier aggregation based on Rel-10 is performed by the PCell. Therefore, in the PCell, the DRX control as described above can be applied to the SPS communication. Meanwhile, if the carrier aggregation is enhanced and an SPS communication is performed on an SCell, for example, it may be possible to perform communication of a large volume of data on the PCell and perform the SPS communication on the SCell. FIG. 9 is a diagram illustrating an example of a case that the SCell performs SPS communication. As described above, the DRX cycle is basically configured in accordance with a traffic pattern of the PCell; therefore, in this case, an interval that does not involve the monitoring of a PDCCH by the PCell is configured as the power saving mode (DRXoff). Therefore, because the SCell operates in conjunction with the PCell, the same power saving mode interval (DRXoff duration) as that of the PCell is set.

However, when the power saving mode interval is in the SCell in conjunction with the PCell, the mobile station monitors a PDCCH in an interval in which no VoIP packet is generated. Therefore, electric power is wasted (see the SCell in FIG. 9).

Figure 10:
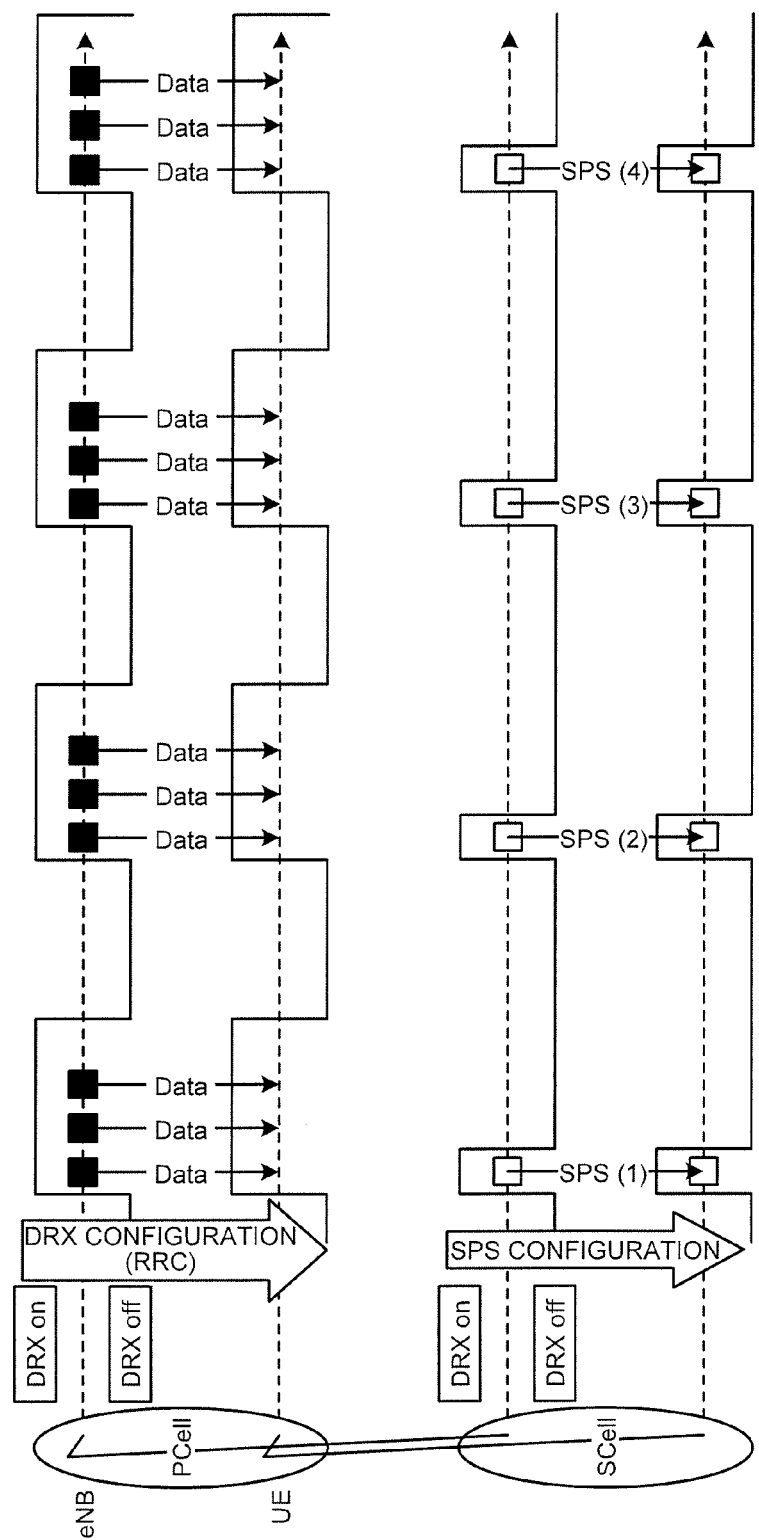
FIG. 10 is a diagram illustrating an example of a case that DRX is individually controlled for each of carriers.

Incidentally, it may be possible to enhance the DRX control and individually apply the DRX control to each of the carriers. FIG. 10 is a diagram illustrating an example of a case that the DRX control is individually performed for each of the carriers. In this case, the DRX control on the PCell is performed in accordance with the traffic pattern of the PCell, and the DRX control on the SCell is performed in accordance with the traffic pattern of the SCell. Therefore, it is possible to reduce waste of electric power compared with the case illustrated in FIG. 9, enabling to further save electric power.

However, even during the power saving mode (DRXoff duration), certain specifications, such as radio measurements (for example, a measurement of the same frequency or a measurement of a different frequency) are defined. Therefore, the mobile station performs minimum signal processing to comply with the specifications. Namely, even when the DRX control is individually performed for each of the carriers, the mobile station still performs monitoring of a PDCCH and a PDSCH.

Therefore, in the present embodiment, for example, the power consumption of the mobile station of an SCell is further reduced when DRX is optimized by the PCell.

Figure 11:
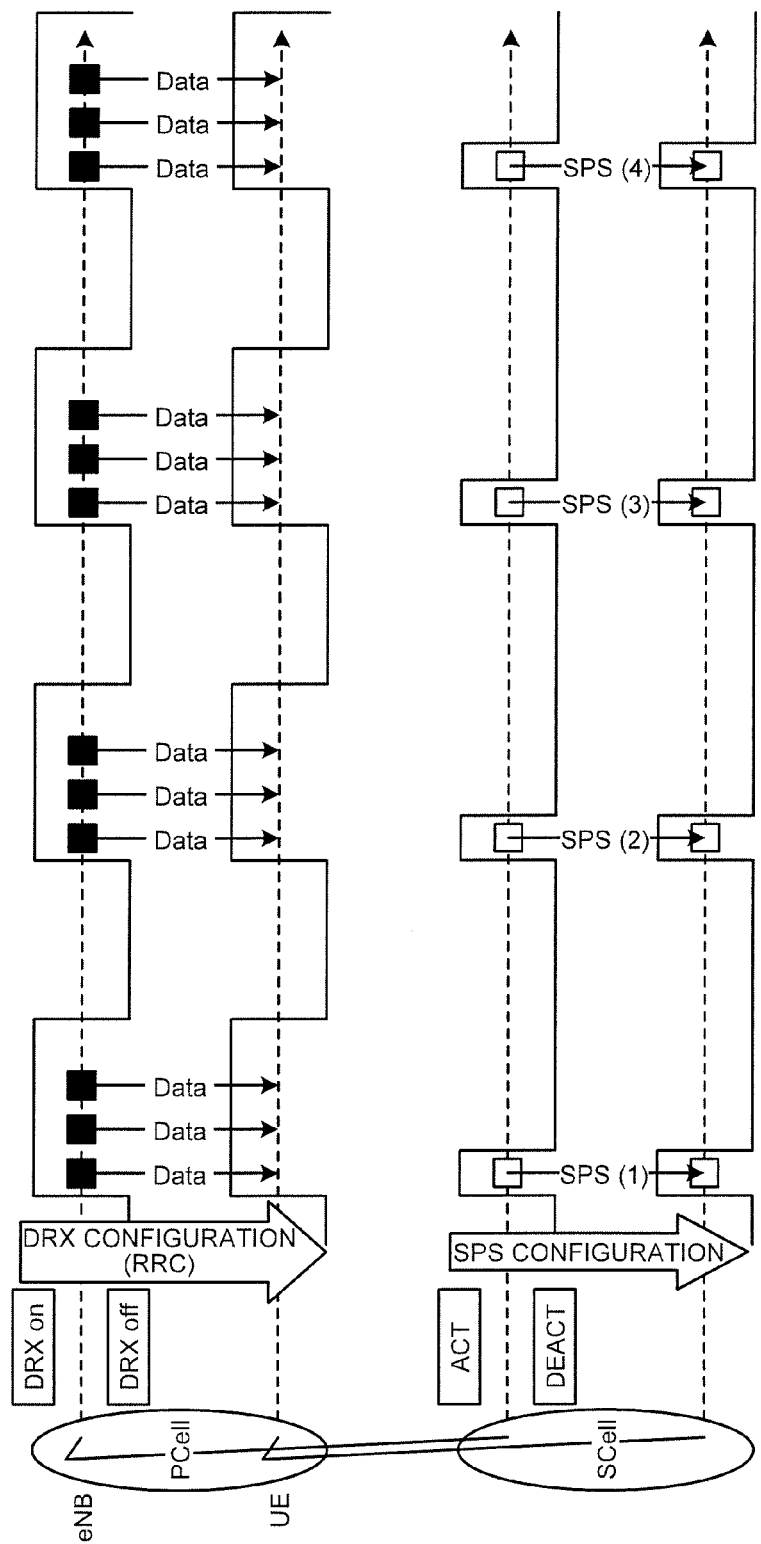
FIG. 11 is a diagram illustrating an example of a wireless communication method according to a first embodiment.

The wireless communication method of the present embodiment will be explained below. FIG. 11 is a diagram illustrating an example of the wireless communication method according to the first embodiment. In the present embodiment, the mobile station autonomously controls Activation/Deactivation of an SCell (autonomous Activation/Deactivation control) in accordance with the SPS communication. Namely, at a transmission timing of the SPS data, the mobile station autonomously performs Activation (autonomous Activation) of the SCell (the base station does not transmit an ACT command illustrated in FIG. 8). When the transmission/reception of SPS data is completed (namely, when ACK is detected), the mobile station autonomously performs Deactivate (autonomous Deactivation) of the SCell (the base station does not transmit a DEACT command illustrated in FIG. 8).

In the present embodiment, an SPS performed by the base station ("SPS configuration" in FIG. 11) also serves as an ACT/DEACT command illustrated in FIG. 8. Specifically, as a trigger for starting the autonomous Activation/Deactivation control as described above, two timings may be applied. The first timing is a timing at which an SPS by RRC (setting of information indicating what radio parameter is used in what cycle) is received. The second timing is a timing at which the SPS communication is turned to Activation by a PDCCH (a timing at which the mobile station receives an Activation command for the SPS communication). Meanwhile, as a trigger for terminating the autonomous Activation/Deactivation control, there are a timing at which an SPS is deleted by RRC (an SPS release notice) and a timing at which the SPS communication is turned to Deactivation by a PDCCH (uplink and downlink). As for the uplink SPS communication, it may be possible to configure a trigger for terminating the autonomous Activation/Deactivation control at a timing at which the mobile station completes a predetermined number of empty transmissions specified by a parameter called implicitReleaseAfter.

In the above example, the mobile station autonomously performs the Activation/Deactivation control; however, it is not limited thereto. It may be possible to perform the control quasi-autonomously. For example, whether or not the base station permits to perform the autonomous Activation/Deactivation control as described above may be notified by the above RRC or PDCCH. When the autonomous Activation/Deactivation control is performed quasi-autonomously, signaling of 1 bit is satisfactory. For example, a bit value of 1 indicates permission of the autonomous Activation/Deactivation control and a bit value of 0 indicates non-permission. Namely, execution of the Activation control and the Deactivation control are explicitly indicated.

Figure 12:
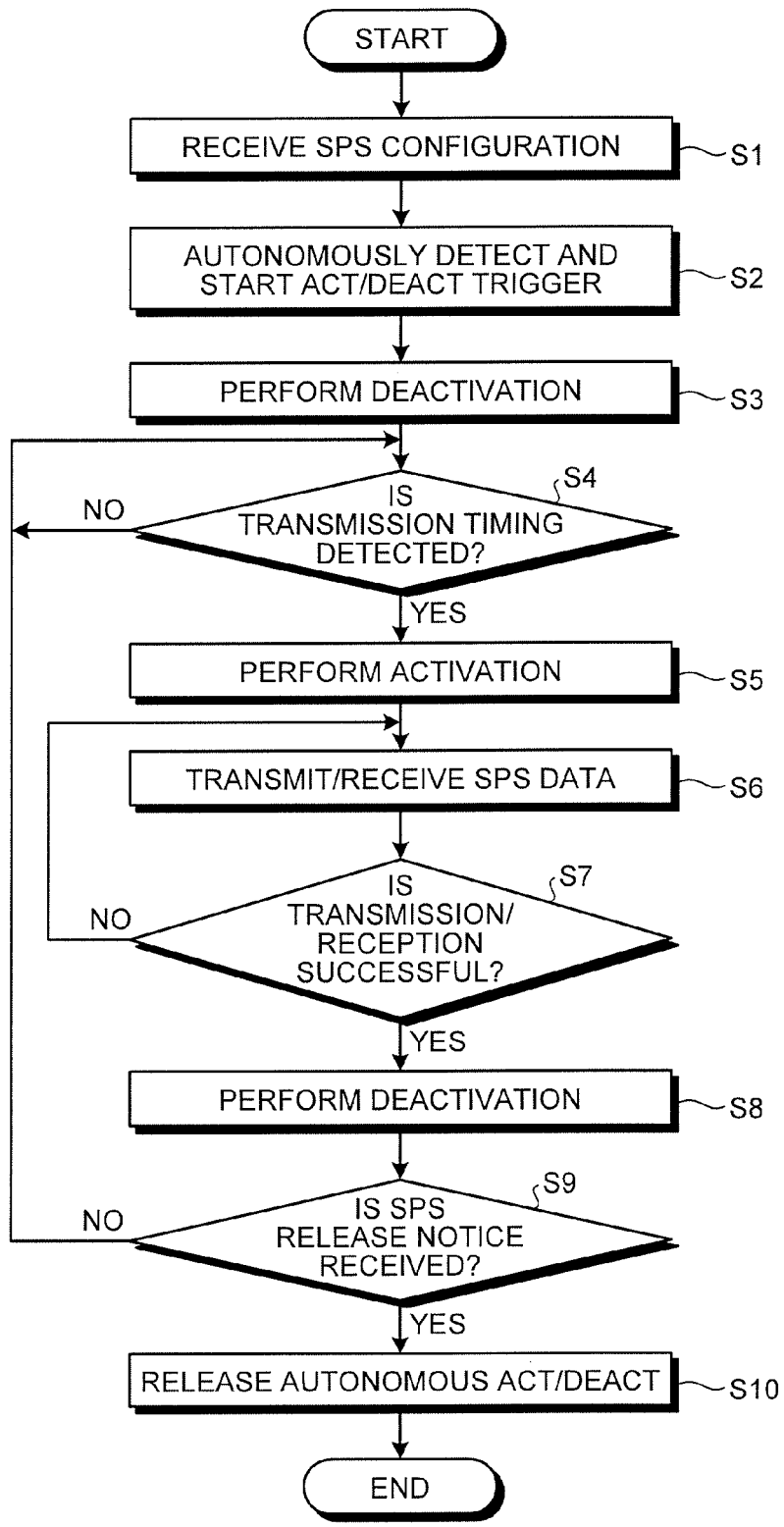
FIG. 12 is a flowchart illustrating an operation of the mobile station.
Figure 13:
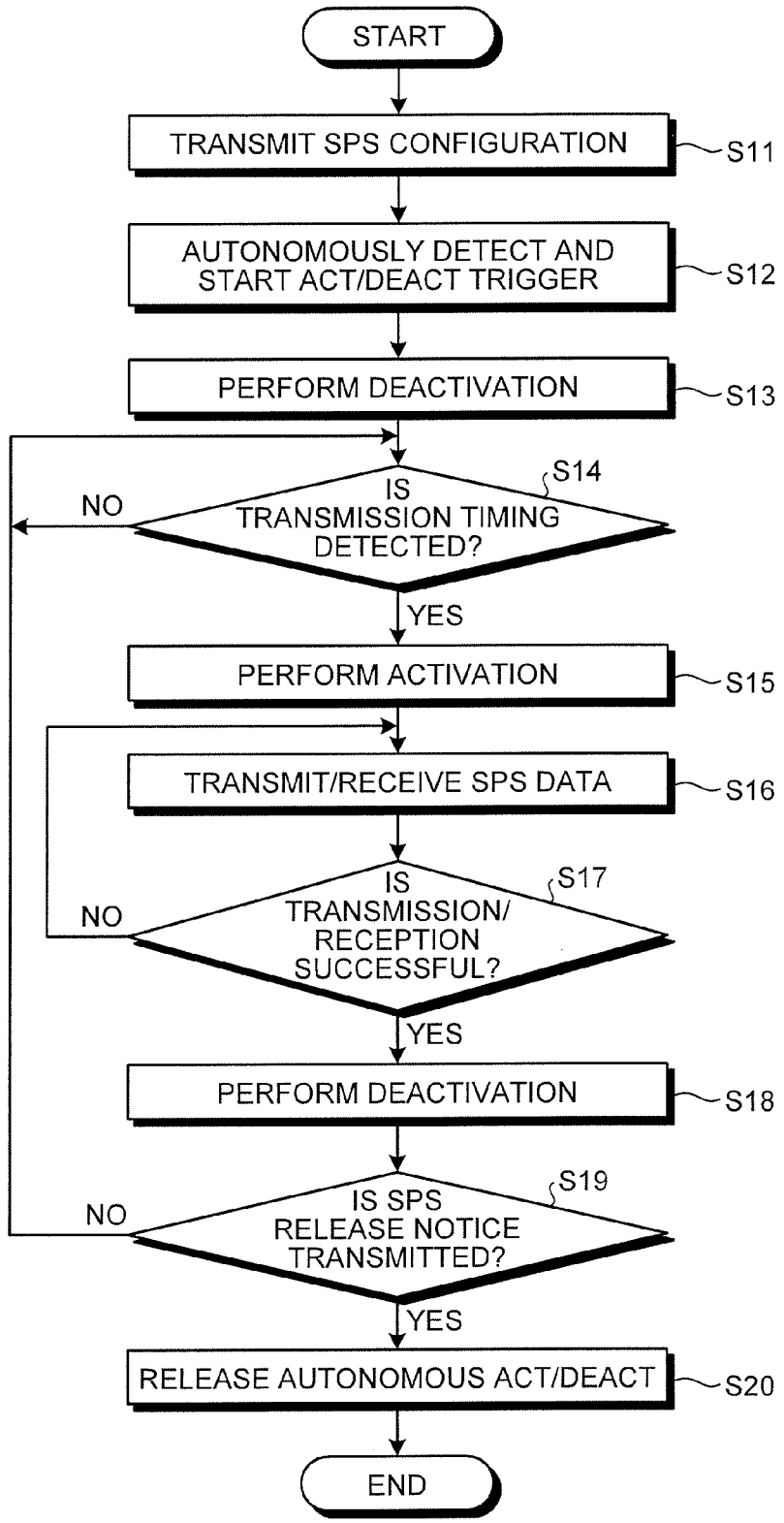
FIG. 13 is a flowchart illustrating an operation of the base station.

Operations of the base station and the mobile station for implementing the wireless communication method (a first method) of the present embodiment will be explained below with reference to flowcharts. FIG. 12 is a flowchart illustrating an operation of the mobile station. FIG. 13 is a flowchart illustrating an operation of the base station.

The operation of the mobile station will be explained below with reference to FIG. 12. First, the transmission/reception control unit 34 receives an "SPS configuration" transmitted by "RRC Connection Reconfiguration" via the transmitting/receiving unit 11 (S1), and notifies the SPS control unit 21 of information on the "SPS configuration". Subsequently, the SPS control unit 21 controls processes related to the SPS communication.

The ACT/DEACT managing unit 32 starts autonomous Activation/Deactivation control at the reception timing of the "SPS configuration" (S2). At the same time, the SPS transmission managing unit 31 starts a process for detecting a transmission timing of SPS data as an "autonomous ACT/DEACT trigger" (S2). The ACT/DEACT managing unit 32 performs Deactivation of the SCell as an initial state (S3), and stores the current state (Deactivation) of the SCell in the storage unit 22.

Thereafter, the SPS transmission managing unit 31 waits for the transmission timing of the SPS data (No at S4). When the transmission timing is detected (Yes at S4), the ACT/DEACT managing unit 32 autonomously performs Activation of the SCell (S5), and stores (updates) the current state (Activation) of the SCell in the storage unit 22.

Subsequently, the SPS transmission managing unit 31 performs a process for transmitting and receiving SPS data (S6). Specifically, when the transmission/reception fails (No at S7), a retransmission process at S6 and S7 is repeated until the transmission/reception is successfully performed. On the other hand, when the SPS transmission managing unit 31 successfully transmits and receives the SPS data (Yes at S7), the ACT/DEACT managing unit 32 autonomously performs Deactivation of the SCell (S8), and stores (updates) the current state (Deactivation) of the SCell in the storage unit 22.

Thereafter, until the transmission/reception control unit 34 receives an "SPS release notice" that is transmitted by "RRC Connection Reconfiguration" via the transmitting/receiving unit 11 (No at S9), the mobile station repeats the above processes from S4 to S8 (the autonomous Activation/Deactivation control). When receiving the "SPS release notice" (Yes at S9), the transmission/reception control unit 34 notifies the SPS control unit 21 of information on the "SPS release notice". The ACT/DEACT managing unit 32 terminates the autonomous Activation/Deactivation control at the reception timing of the "SPS release notice". At the same time, the SPS transmission managing unit 31 terminates the process for detecting the transmission timing of the SPS data (S10).

The operation of the base station will be explained below with reference to FIG. 13. The SPS control unit 51 controls processes related to the SPS communication. First, the transmission/reception control unit 64 transmits an "SPS configuration" by "RRC Connection Reconfiguration" via the transmitting/receiving unit 43 (S11).

The ACT/DEALT managing unit 62 starts the autonomous Activation/Deactivation control at the transmission timing of the "SPS configuration" (S12). At the same time, the SPS transmission managing unit 61 starts a process for detecting a transmission timing of SPS data as an "autonomous ACT/DEACT trigger" (S12). The ACT/DEACT managing unit 62 performs Deactivation of the SCell as an initial state (S13), and stores the current state (Deactivation) of the SCell in the storage unit 52.

Thereafter, the SPS transmission managing unit 61 waits for the transmission timing of the SPS data (No at S14). When the transmission timing is detected (Yes at S14), the ACT/DEACT managing unit 62 autonomously performs Activation of the SCell (S15), and stores (updates) the current state (Activation) of the SCell in the storage unit 52.

Subsequently, the SPS transmission managing unit 61 performs a process for transmitting and receiving the SPS data (S16). Specifically, when the transmission/reception fails (No at S17), a retransmission process at S16 and S17 is repeated until the process is successfully performed. On the other hand, when the SPS transmission managing unit 61 successfully transmits and receives the SPS data (Yes at S17), the ACT/DEACT managing unit 62 autonomously performs Deactivation of the SCell (S18), and stores (updates) the current state (Deactivation) of the SCell in the storage unit 52.

Thereafter, until the transmission/reception control unit 64 receives an "SPS release notice" by "RRC Connection Reconfiguration" via the transmitting/receiving unit 43 (No at S19), the base station repeats the above processes from S14 to S18 (the autonomous Activation/Deactivation control). When the transmission/reception control unit 64 transmits the "SPS release notice" (Yes at S19), the ACT/DEACT managing unit 62 terminates the autonomous Activation/Deactivation control at the transmission timing of the "SPS release notice" (S20). At the same time, the SPS transmission managing unit 61 terminates the process for detecting the transmission timing of the SPS data (S20).

Figure 14:
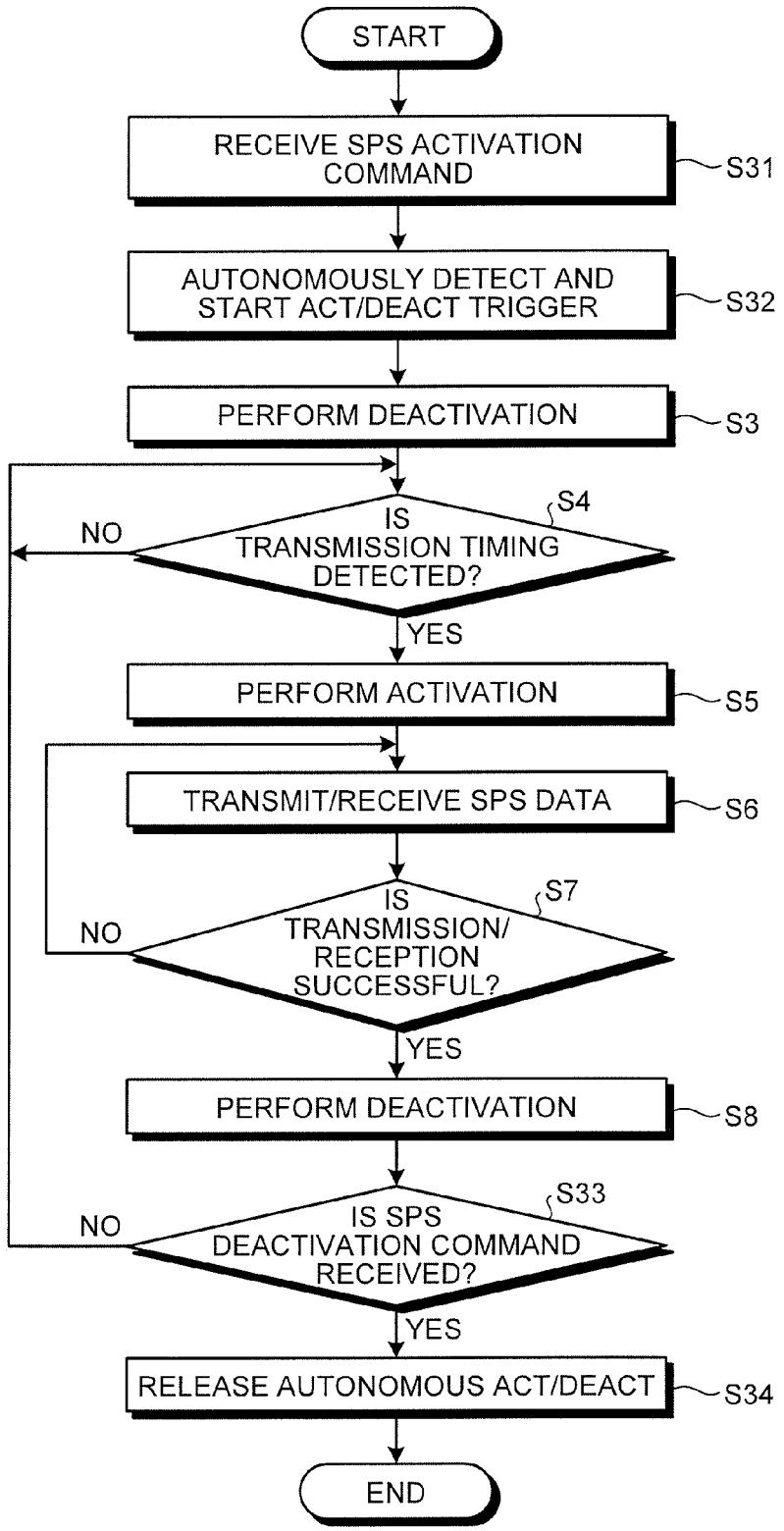
FIG. 14 is a flowchart illustrating an operation of the mobile station.
Figure 15:
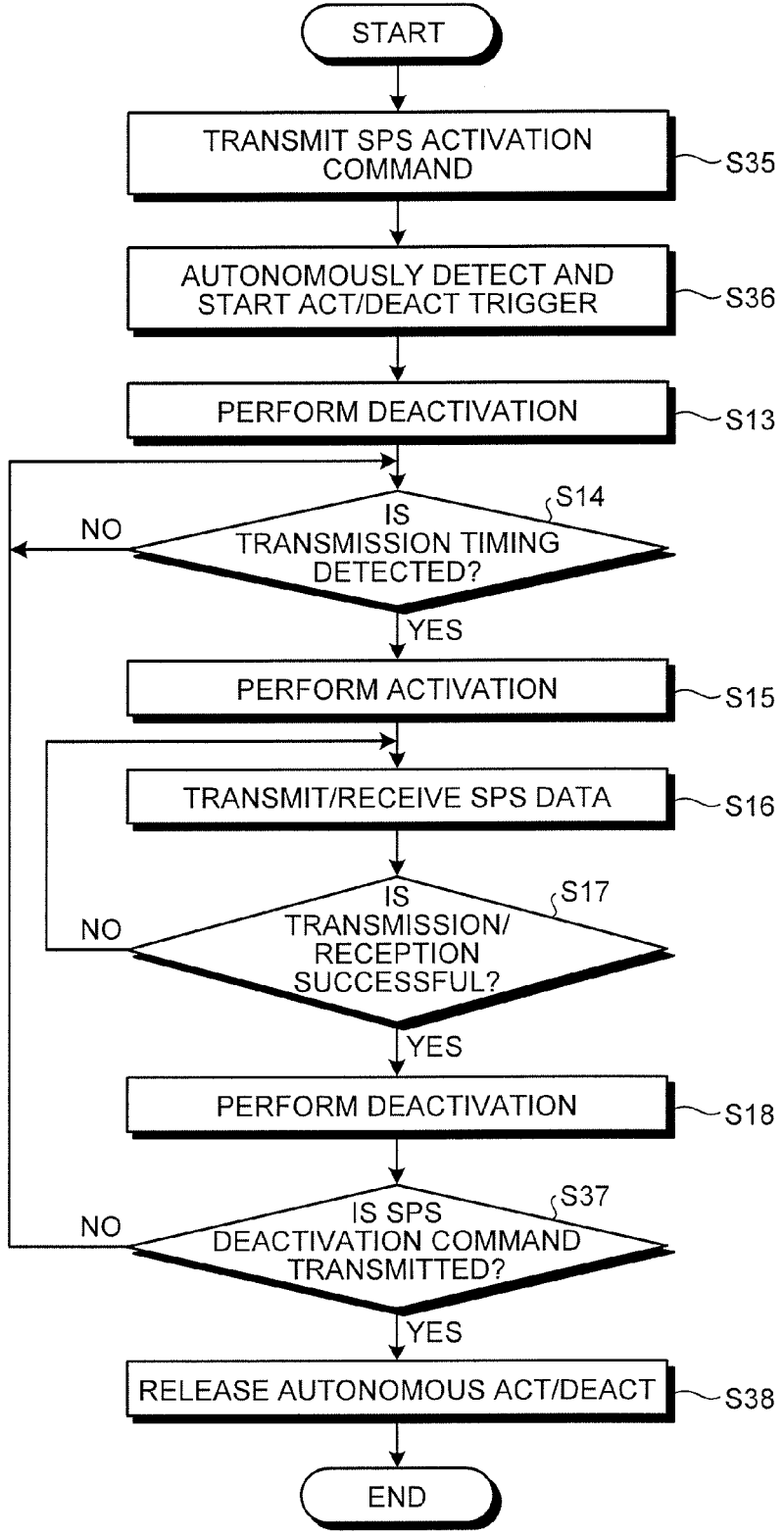
FIG. 15 is a flowchart illustrating an operation of the base station.

A wireless communication method (a second method) different from the first method of the embodiment will be explained below with reference to flowcharts. FIG. 14 is a flowchart illustrating an operation of the mobile station. FIG. 15 is a flowchart illustrating an operation of the base station. The same processes as those explained above are denoted by the same step numbers (S), and the explanation thereof will be omitted. In the following, processes different from the processes in the flowcharts in FIG. 12 and FIG. 13 will be explained. In FIG. 14 and FIG. 15, it is assumed that the process related to the "SPS configuration" is already performed.

In FIG. 14, in the mobile station, when receiving an SPS Activation command transmitted by a PDCCH via the transmitting/receiving unit 11 (S31), the transmission/reception control unit 34 notifies the SPS control unit 21 of the reception of the Activation command. The ACT/DEACT managing unit 32 starts the autonomous Activation/Deactivation control at the reception timing of the Activation command (S32). At the same time, the SPS transmission managing unit 31 starts a process for detecting a transmission timing of the SPS data as an "autonomous ACT/DEACT trigger" (S32).

After S8, until the transmission/reception control unit 34 receives an SPS Deactivation command transmitted by a PDCCH via the transmitting/receiving unit 11 (No at S33), the mobile station repeats the above processes from S4 to S8 (the autonomous Activation/Deactivation control). When receiving the SPS Deactivation command (Yes at S33), the transmission/reception control unit 34 notifies the SPS control unit 21 of the reception of the Deactivation command. The ACT/DEACT managing unit 32 terminates the autonomous Activation/Deactivation control at the reception timing of the Deactivation command, and at the same time, the SPS transmission managing unit 31 terminates the process for detecting the transmission timing of the SPS data (S34).

Meanwhile, in FIG. 15, in the base station, the transmission/reception control unit 64 transmits the SPS Activation command by the PDCCH via the transmitting/receiving unit 43 (S35). The ACT/DEACT managing unit 62 starts the autonomous Activation/Deactivation control at the transmission timing of the Activation command (S36). At the same time, the SPS transmission managing unit 61 starts a process for detecting the transmission timing of the SPS data as an "autonomous ACT/DEACT trigger" (S36).

After S18, until the transmission/reception control unit 64 transmits the SPS Deactivation command by the PDCCH via the transmitting/receiving unit 43 (No at S37), the base station repeats the above processes from S14 to S18 (the autonomous Activation/Deactivation control). When the transmission/reception control unit 64 transmits the SPS Deactivation command (Yes at S37), the ACT/DEACT managing unit 62 terminates the autonomous Activation/Deactivation control at the transmission timing of the Deactivation command (S38). At the same time, the SPS transmission managing unit 61 terminates the process for detecting the transmission timing of the SPS data (S38).

Figure 16:
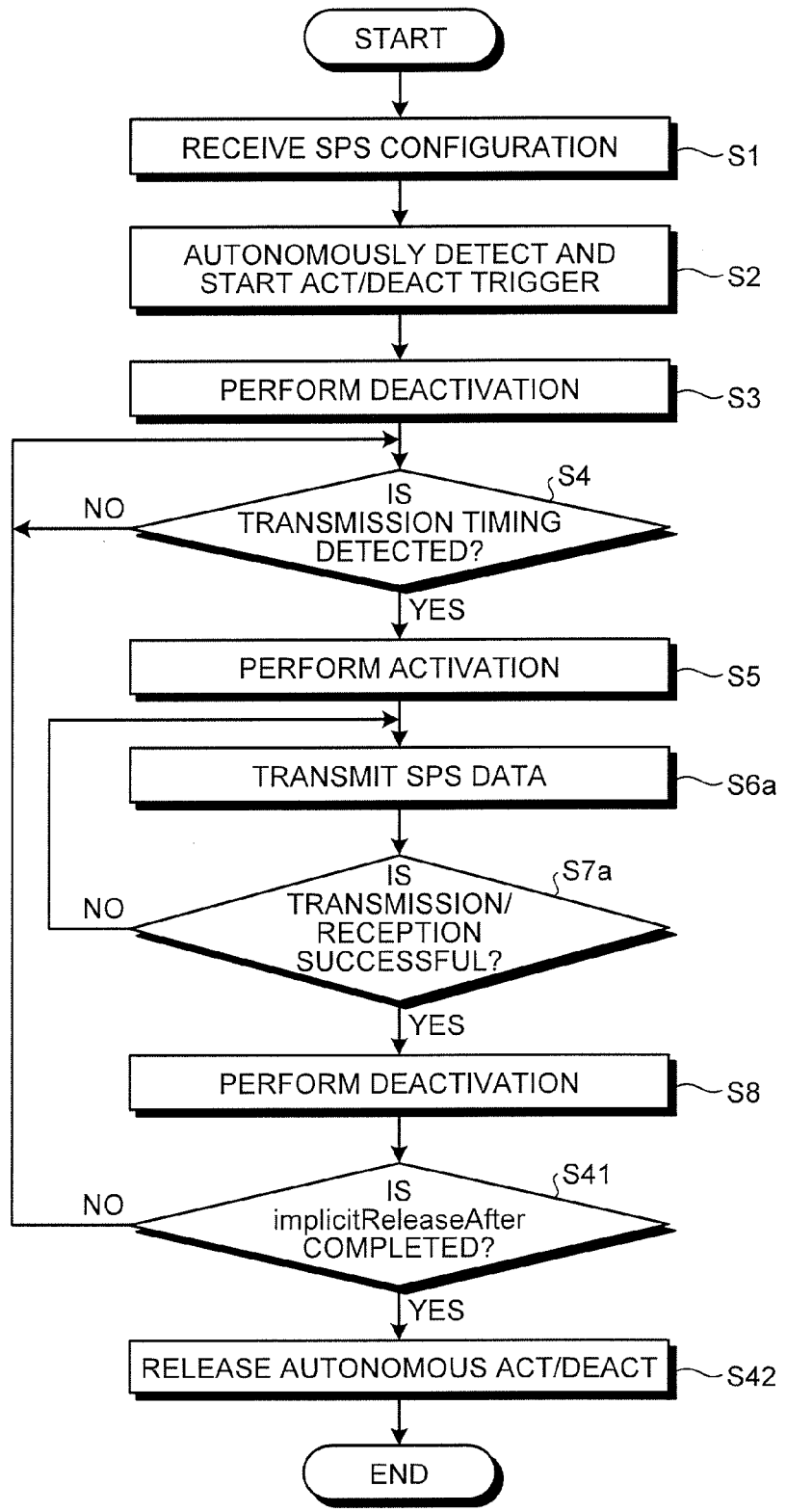
FIG. 16 is a flowchart illustrating an operation of the mobile station.
Figure 17:
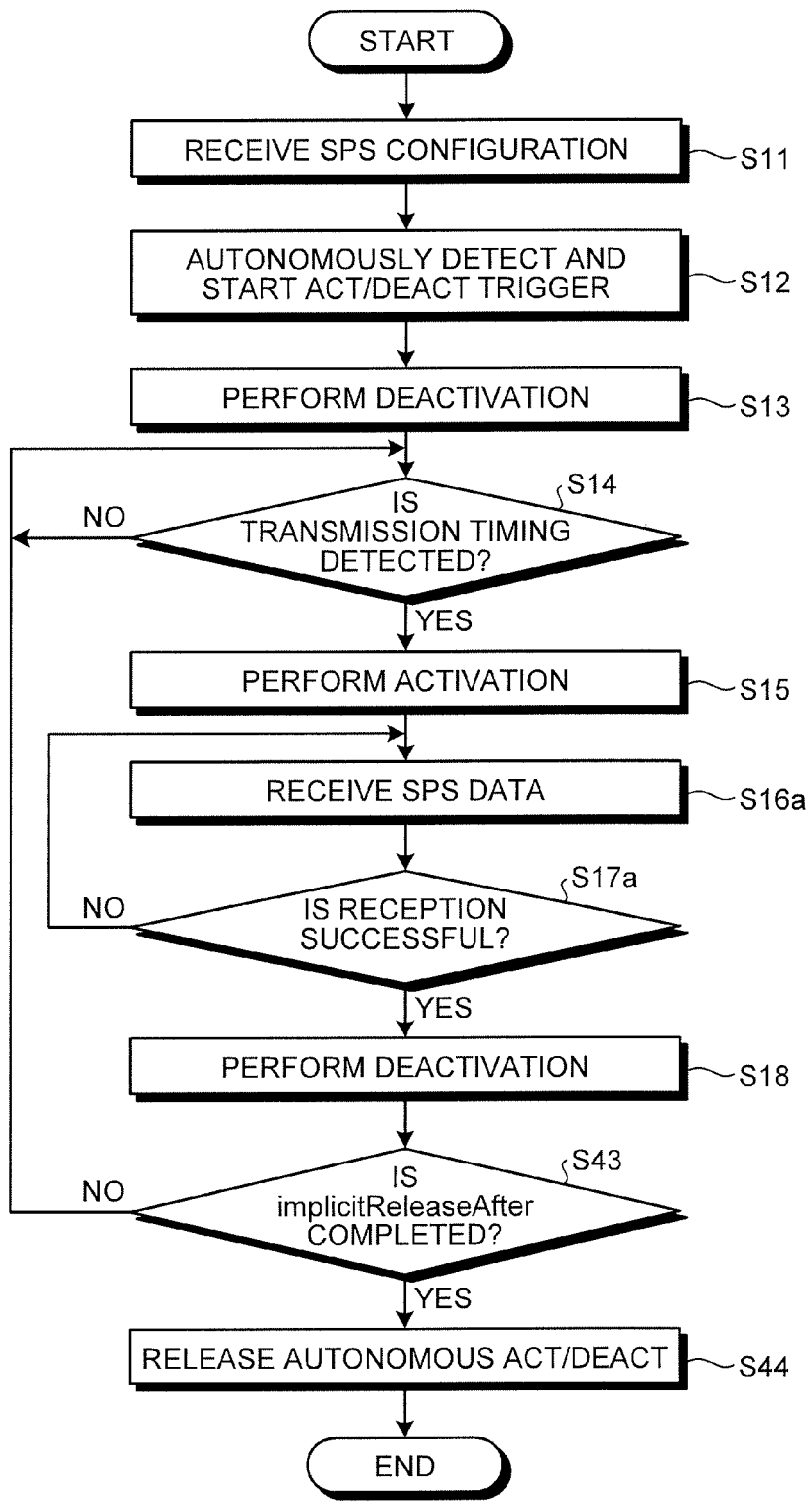
FIG. 17 is a flowchart illustrating an operation of the base station.

A wireless communication method (a third method) different from the first and the second methods will be explained below with reference to flowcharts. This method is applied to only uplink SPS communication. FIG. 16 is a flowchart illustrating an operation of the mobile station. FIG. 17 is a flowchart illustrating an operation of the base station. The same processes as those explained above are denoted by the same step numbers (S), and the explanation thereof will be omitted. In the following, processes different from the processes in the flowchart in FIG. 12 and FIG. 13 will be explained.

At S5 in FIG. 16, after the ACT/DEACT managing unit 32 autonomously performs Activation of the SCell, the SPS transmission managing unit 31 performs a process for transmitting the SPS data (S6a). Specifically, when the transmission of the SPS data fails (No at S7a), the SPS transmission managing unit 31 repeats a retransmission process at S6a and S7a until the transmission is successfully performed. On the other hand, when the SPS transmission managing unit 31 successfully transmits the SPS data (Yes at S7a), the ACT/DEACT managing unit 32 autonomously performs Deactivation of the SCell (S8), and stores (updates) the current state (Deactivation) of the SCell in the storage unit 22.

Thereafter, the transmission/reception control unit 34 performs empty transmission specified by a parameter called implicitReleaseAfter via the transmitting/receiving unit 11. Until a predetermined number of empty transmissions is completed (No at S41), the mobile station repeats the above processes from S4 to S8 (the autonomous Activation/Deactivation control). When the predetermined number of empty transmissions is completed (Yes at S41), the transmission/reception control unit 34 notifies the SPS control unit 21 of the completion of the transmission. The ACT/DEACT managing unit 32 terminates the autonomous Activation/Deactivation control at a timing of the completion of the predetermined number of empty transmissions, and at the same time, the SPS transmission managing unit 31 terminates the process for detecting the transmission timing of the SPS data (S42).

At S15 in FIG. 17, after the ACT/DEACT managing unit 62 autonomously performs Activation of the SCell, the SPS transmission managing unit 61 performs a process for receiving the SPS data (S16a). Specifically, when reception of the SPS data fails (No at S17a), the SPS transmission managing unit 61 repeats a retransmission process from S16a and S17a until the reception is successfully performed. On the other hand, when the SPS transmission managing unit 61 successfully receives the SPS data (Yes at S17a), the ACT/DEACT managing unit 62 autonomously performs Deactivation of the SCell (S18), and stores (updates) the current state (Deactivation) of the SCell in the storage unit 22.

Thereafter, the transmission/reception control unit 64 receives empty transmission specified by a parameter called implicitReleaseAfter via the transmitting/receiving unit 43. Until the reception of the predetermined number of empty transmissions is completed (No at S43), the base station repeats the above processes from S14 to S18 (the autonomous Activation/Deactivation control). When the reception of the predetermined number of empty transmissions is completed (Yes at S43), the ACT/DEACT managing unit 62 terminates the autonomous Activation/Deactivation control at a timing at which the reception of the predetermined number of empty transmissions is completed (S44). At the same time, the SPS transmission managing unit 61 terminates the process for detecting the transmission timing of the SPS data (S44).

Figure 18:
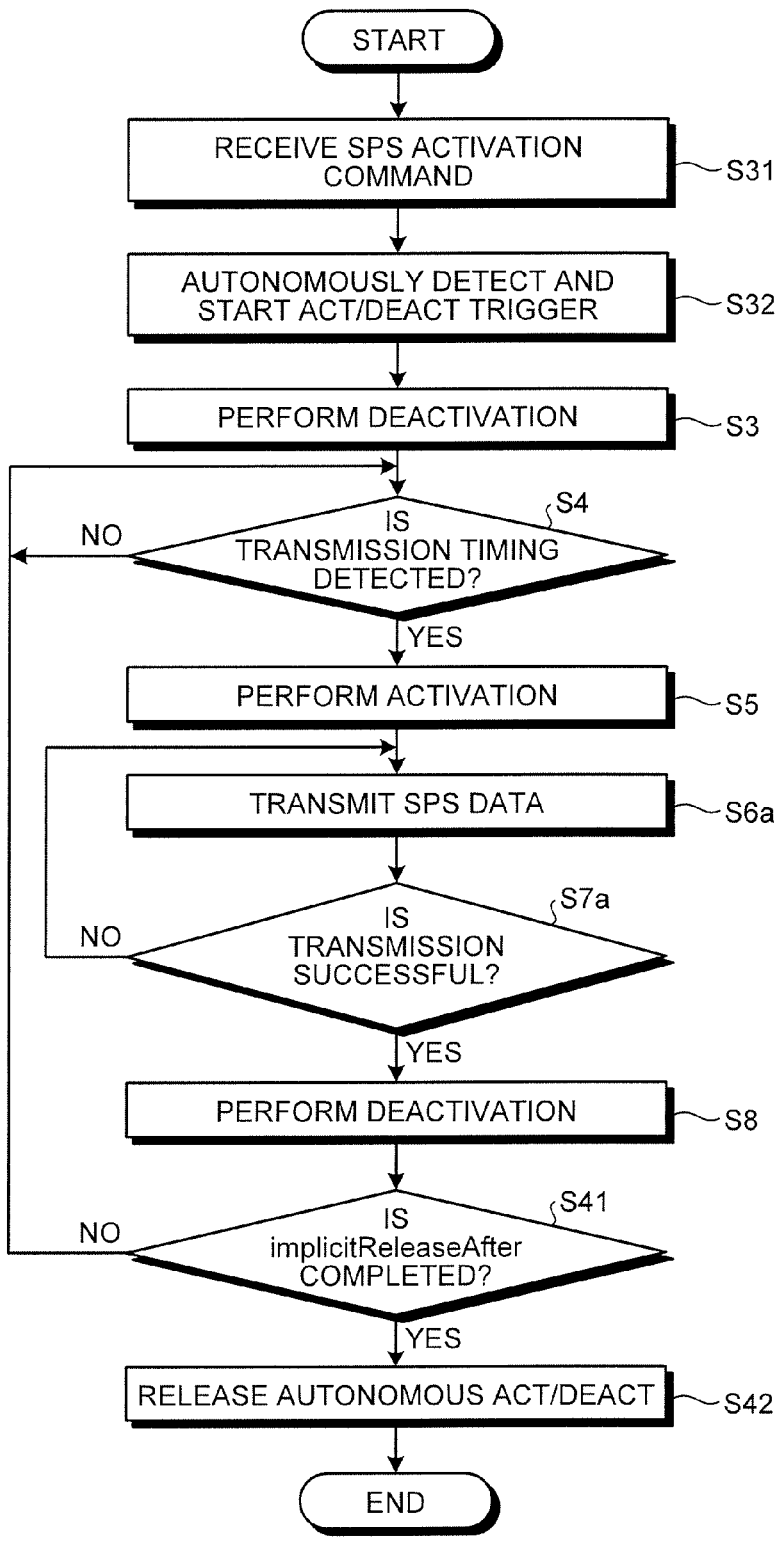
FIG. 18 is a flowchart illustrating an operation of the mobile station.
Figure 19:
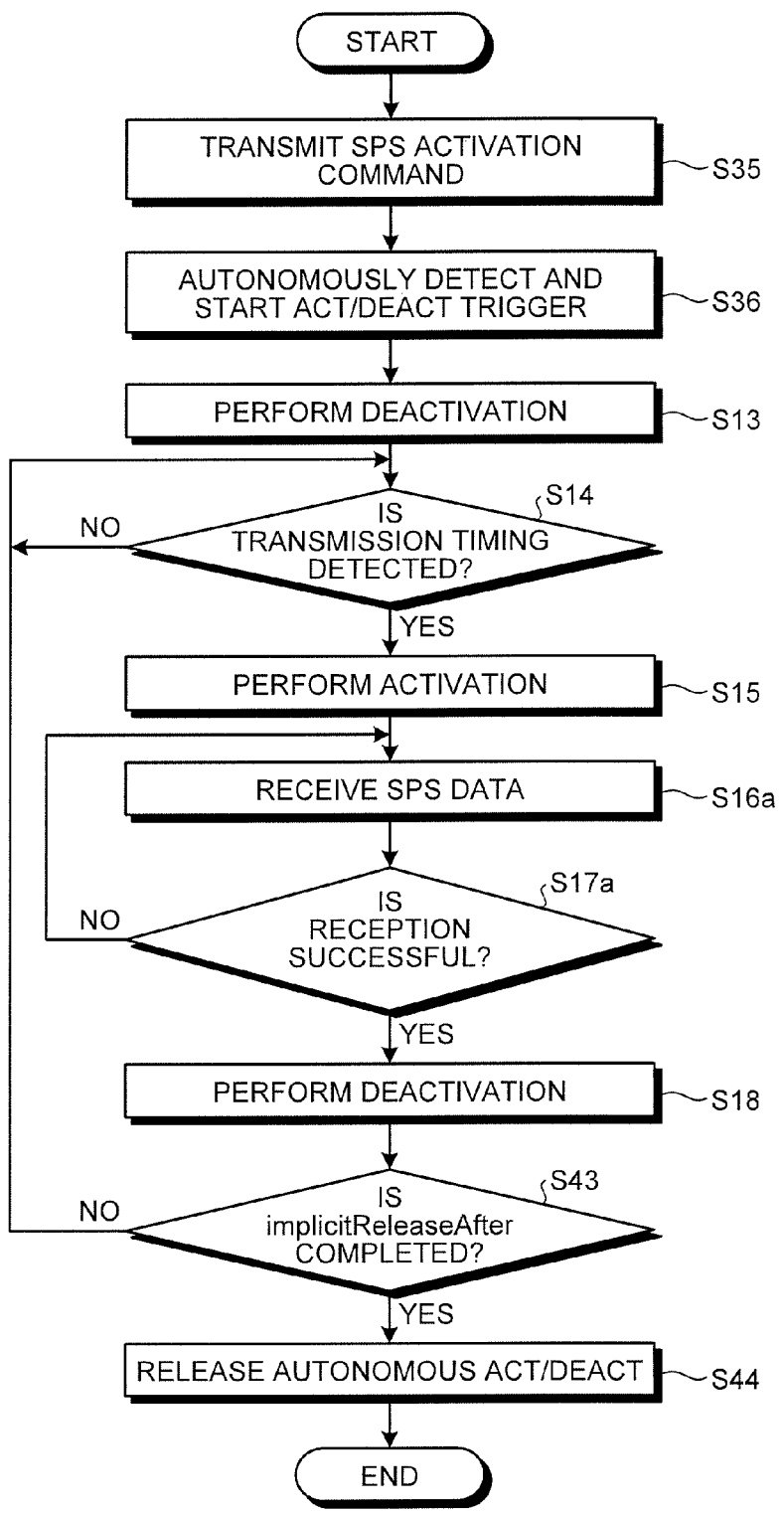
FIG. 19 is a flowchart illustrating an operation of the base station.

A wireless communication method (a fourth method) different from the first, the second, and the third methods will be explained below with reference to flowcharts. This method is applied to only uplink communication. FIG. 18 is a flowchart illustrating an operation of the mobile station. FIG. 19 is a flowchart illustrating an operation of the base station.

In FIG. 18, the characteristic process illustrated in FIG. 16 is applied to the mobile station that operates as illustrated in FIG. 14. Specifically, the mobile station performs the processes at S6a, S7a, S41, and S42 instead of the processes at S6, S7, S33, and S34 in FIG. 14.

In FIG. 19, the characteristic process illustrated in FIG. 17 is applied to the base station that operates as illustrated in FIG. 15. Specifically, the base station performs the processes at S16a, S17a, S43, and S44 instead of the processes at S16, S17, S37, and S38 in FIG. 15.

By the control as described above, according to the present embodiment, the SCell does not perform monitoring of a PDCCH and buffering of a PDSCH in the Deactivation state. Therefore, it is possible to reduce waste of electric power compared with DRX, enabling to further save electric power.

Figure 20:
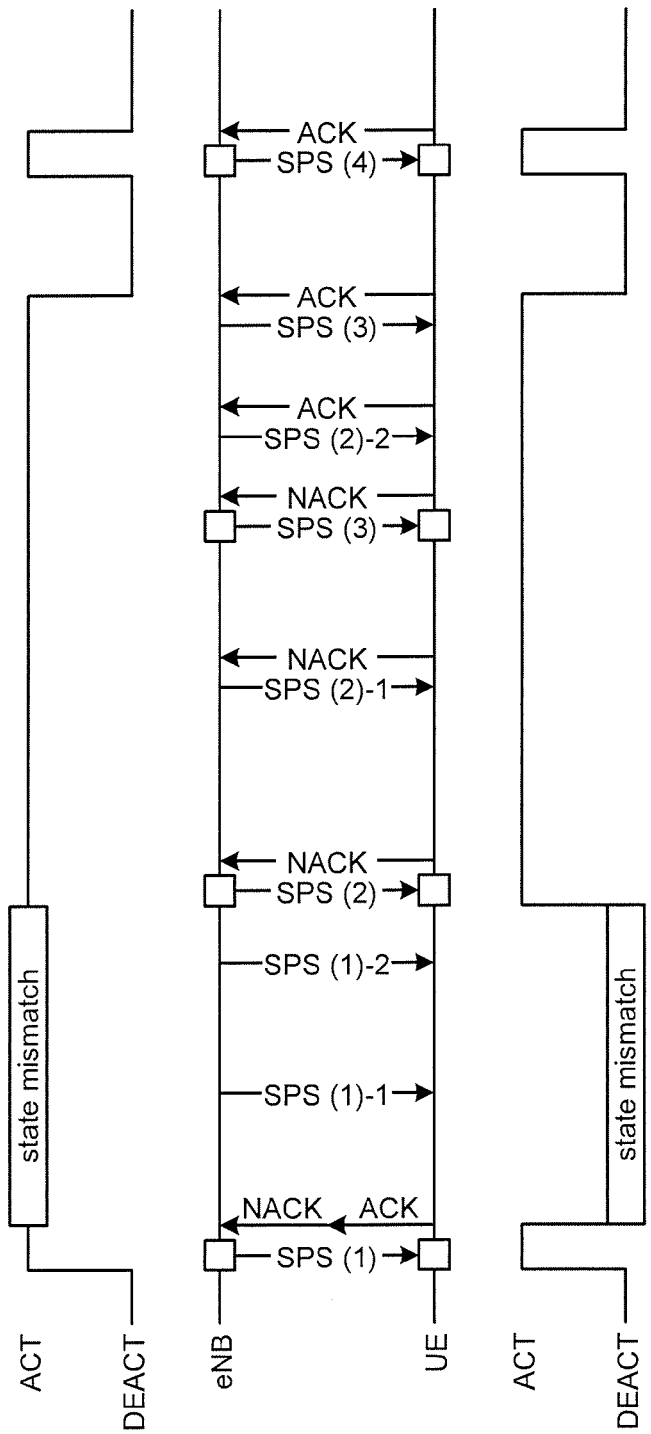
FIG. 20 is a diagram illustrating an example of an operation when the base station judges ACK as NACK.

In the present embodiment, for example, if an error occurs because the base station judges a reply as NACK even when the mobile station sends ACK, the mobile station and the base station perform operations as described below. FIG. 20 is a diagram illustrating an example of operations when the base station judges ACK as NACK. For example, when the mobile station receives SPS (1) as SPS data and sends ACT as a reply, but if the base station judges the reply as NACK by error, the mobile station autonomously performs Deactivation of the SCell. Incidentally, because the base station has judged the reply as NACK, the base station maintains the Activation state of the SCell and continues retransmission of the SPS (1) (SPS (1)-1, SPS (1)-2, ... ). Namely, the state is inconsistent between the mobile station and the base station (state mismatch). In this case, the mobile station is in the Deactivation state and does not receive the retransmitted SPS (1). However, because the mobile station has successfully received the SPS (1), problems can hardly occur.

Figure 21:
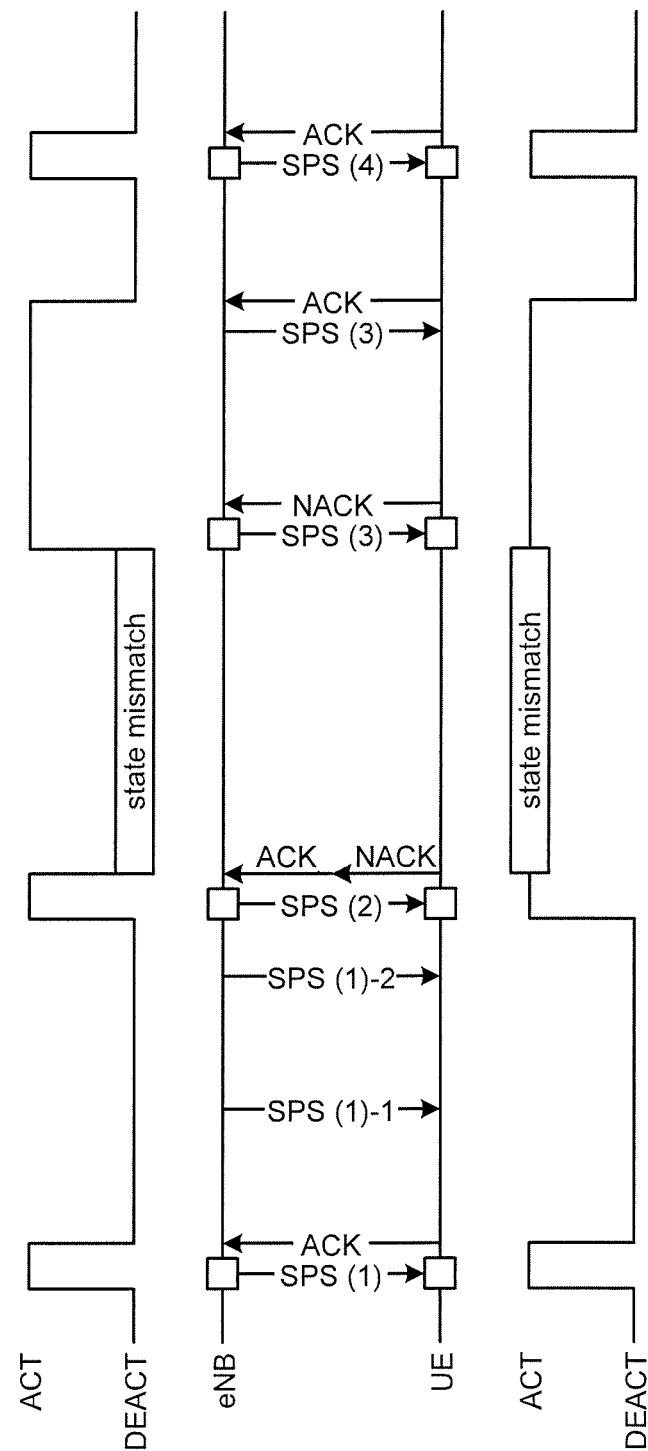
FIG. 21 is a diagram illustrating an example of an operation when the base station judges NACK as ACK.

Furthermore, in the present embodiment, for example, if an error occurs because the base station judges a reply as ACK even when the mobile station sends NACK, the mobile station and the base station perform operations as described below. FIG. 21 is a diagram illustrating an example of operations when the base station judges NACK as ACK. For example, when the mobile station receives SPS (2) and sends NACK as a reply, but if the base station judges the reply as ACK by error, the mobile station autonomously continues the Activation of the SCell. Incidentally, the base station enters the Deactivation state upon reception of ACK, and therefore, the base station does not retransmit the SPS (2). Namely, the state is inconsistent between the mobile station and the base station (state mismatch). In this case, the mobile station loses the SPS (2). However, such an error rarely occurs and can hardly cause a big problem. If such an error occurs, a well-known technology is applicable to compensate for data that has been lost in an application layer of the mobile station.

[b] Second Embodiment

A wireless communication method according to a second embodiment will be explained below. In the first embodiment, it is assumed that the SCell has the SPS data. In the second embodiment, it is assumed that the SCell has another data in addition to the SPS data, that is, data served by "Dynamic Scheduling" is mixed. The configurations of the mobile station and the base station are the same as those of the first embodiment. In the following, processes different from the first embodiment will be explained.

Figure 22:
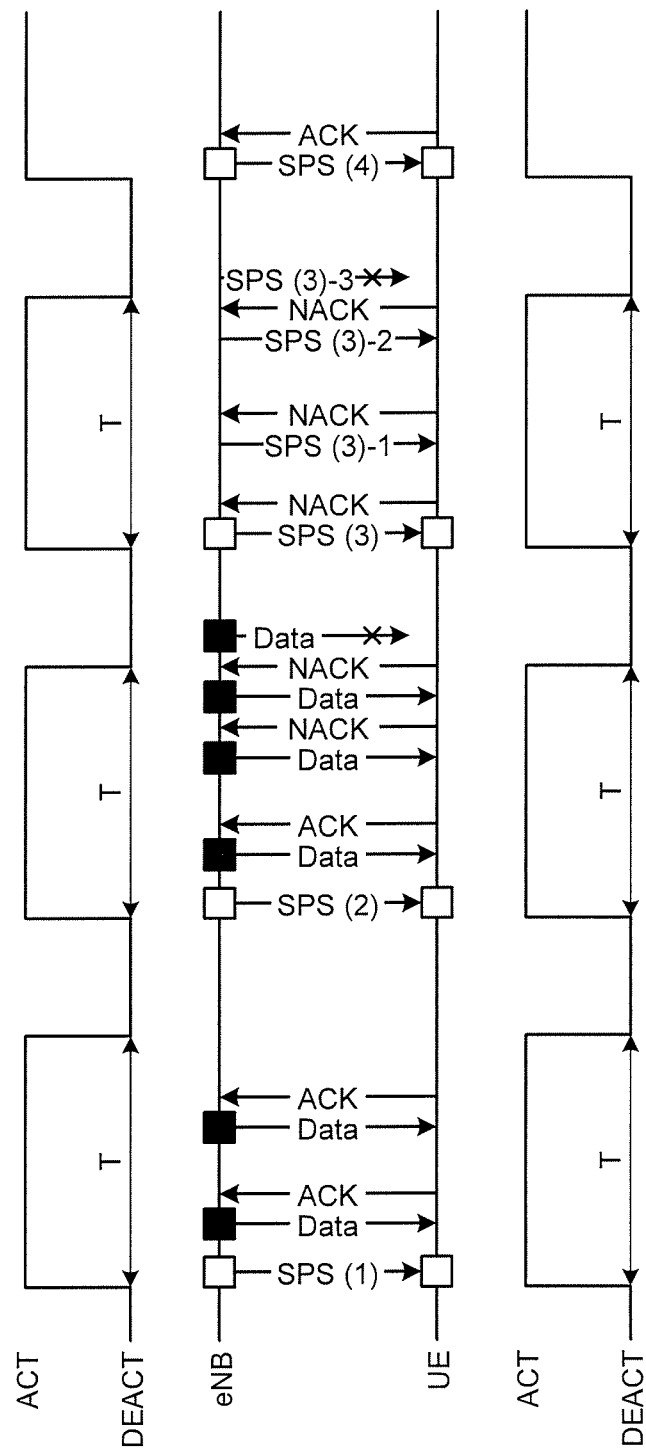
FIG. 22 is a diagram illustrating an example of a wireless communication method according to a second embodiment.

FIG. 22 is a diagram illustrating an example of the wireless communication method according to the second embodiment. In the present embodiment, the autonomous Activation control is the same as that of the first embodiment. Namely, the mobile station autonomously performs Activation of the SCell at the transmission timing of the SPS data. On the other hand, a timing for entering the Deactivation state is different from that of the first embodiment. In the first embodiment, the mobile station enters the Deactivation state at the timing at which transmission of the SPS data is completed (when the mobile station sends ACK as a reply). In the present embodiment, a timing for entering the Deactivation state is after a lapse of a time T from a sub frame that has entered the Activation state. Namely, the mobile station autonomously performs Deactivation of the SCell at a sub frame after a lapse of the time T. Therefore, the base station needs to perform scheduling of the SPS data and normal data during this interval. If scheduling of data fails, the data is lost.

Figure 23:
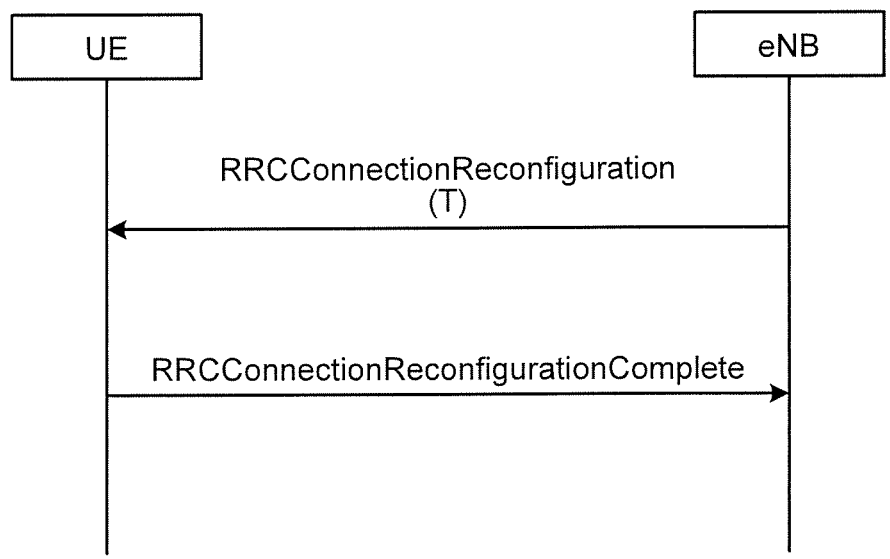
FIG. 23 is a diagram illustrating an example of a case that T is notified by using "RRC Connection Reconfiguration"

As a method to determine the time T, there are a method in which the mobile station autonomously determines T or a method in which the mobile station quasi-autonomously determines T. Examples of the latter method include a method in which the base station notifies a value of T by incorporating it in the RRC or PDCCH described above and a method in which the base station separately notifies a value of T by using an RRC Connection Reconfiguration message. FIG. 23 is a diagram illustrating an example of a case that T is notified by using the RRC Connection Reconfiguration message. In this example, the base station transmits RRC Connection Reconfiguration (T) and the mobile station sends RRC Connection Reconfiguration Complete as a reply.

Figure 24:
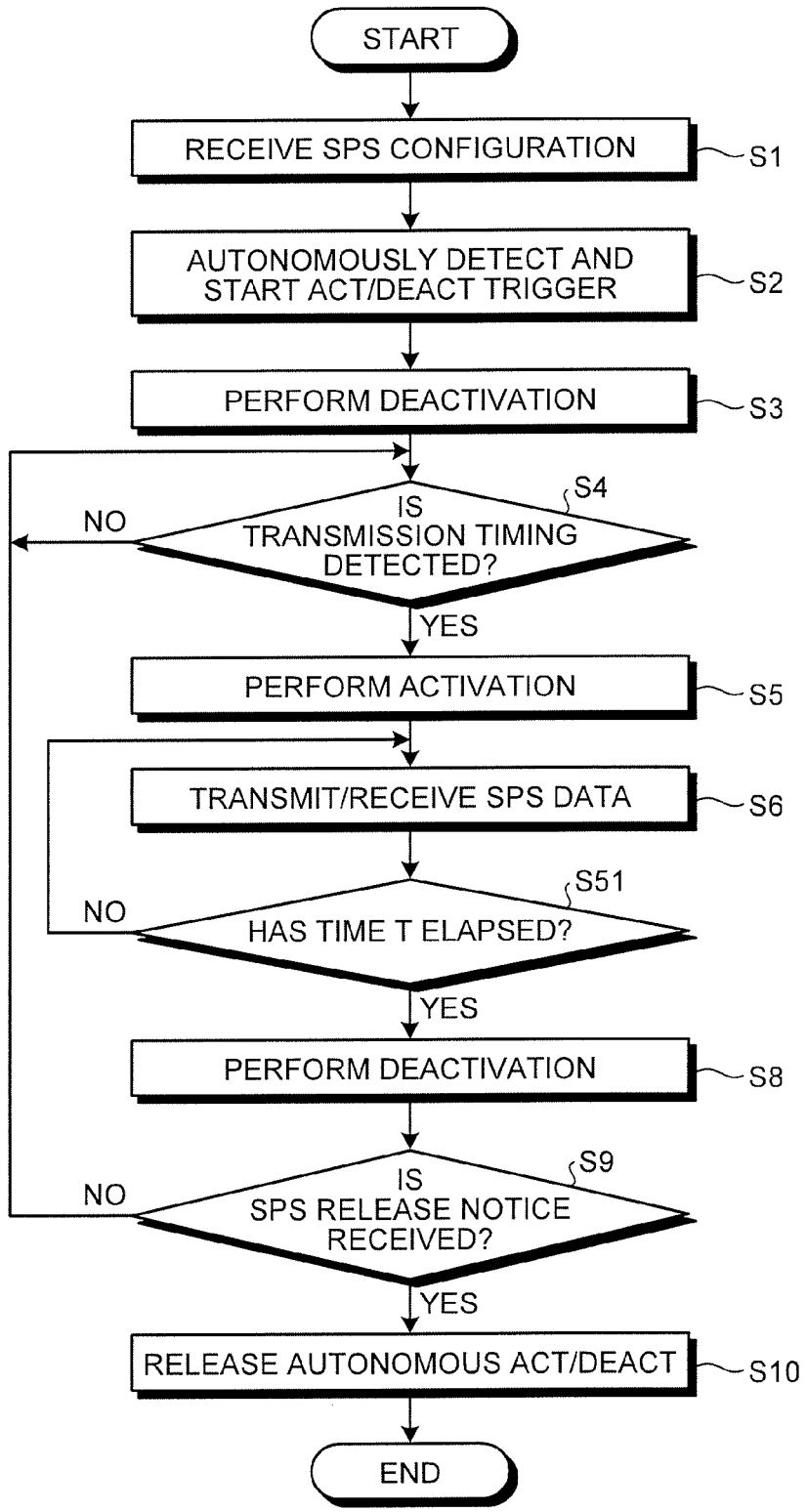
FIG. 24 is a flowchart illustrating an operation of the mobile station.
Figure 25:
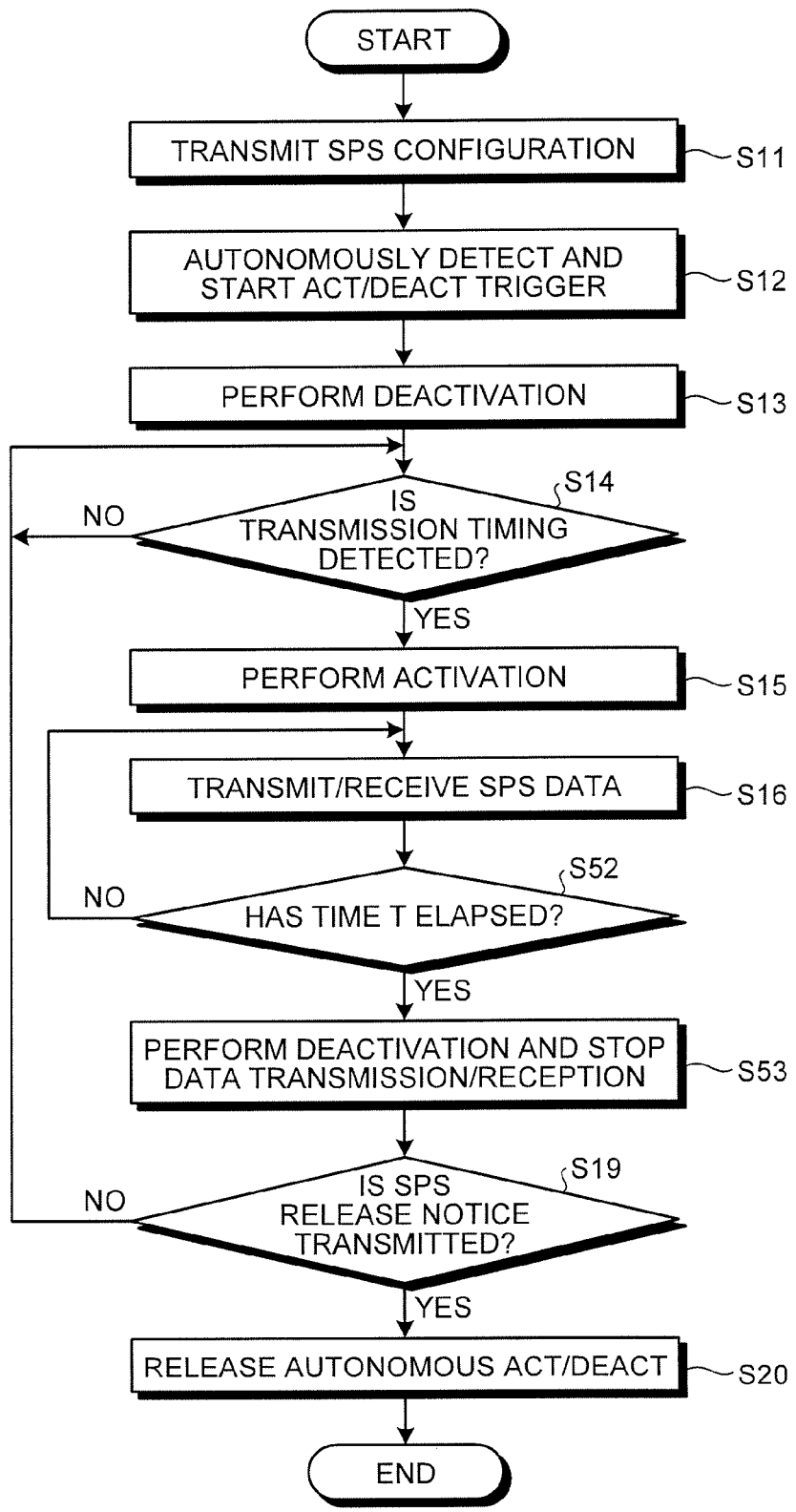
FIG. 25 is a flowchart illustrating an operation of the base station.

Operations of the base station and the mobile station to implement the wireless communication method of the present embodiment (a first method according to the second embodiment) will be explained below with reference to flowcharts. FIG. 24 is a flowchart illustrating an operation of the mobile station. FIG. 25 is a flowchart illustrating an operation of the base station. The same processes as those of the first embodiment are denoted by the same step numbers (S), and the explanation thereof will be omitted. In the following, processes different from the processes of the first embodiment will be explained.

In FIG. 24, in the mobile station, after performing the process for transmitting and receiving the SPS data (S6), the SPS transmission managing unit 31 checks whether a time T has elapsed since Activation. Specifically, when the time T has not elapsed (No at S51), the SPS transmission managing unit 31 continues the process for transmitting and receiving the SPS data (S6). Thereafter, when the SPS transmission managing unit 31 determines that the time T has elapsed (Yes at S51), the ACT/DEACT managing unit 32 autonomously performs Deactivation of the SCell (S8).

In FIG. 25, in the base station, after performing the process for transmitting and receiving the SPS data (S16), the SPS transmission managing unit 61 checks whether the time T has elapsed since the Activation. Specifically, when the time T has not elapsed (No at S52), the SPS transmission managing unit 61 continues the process for transmitting and receiving the SPS data (S16). Thereafter, when the SPS transmission managing unit 61 determines that the time T has elapsed (Yes at S52), the ACT/DEACT managing unit 62 autonomously performs Deactivation of the SCell (S53), and stores (updates) the current state (Deactivation) of the SCell in the storage unit 52. The SPS transmission managing unit 61 als stops the process for transmitting and receiving the SPS data (S53).

Figure 26:
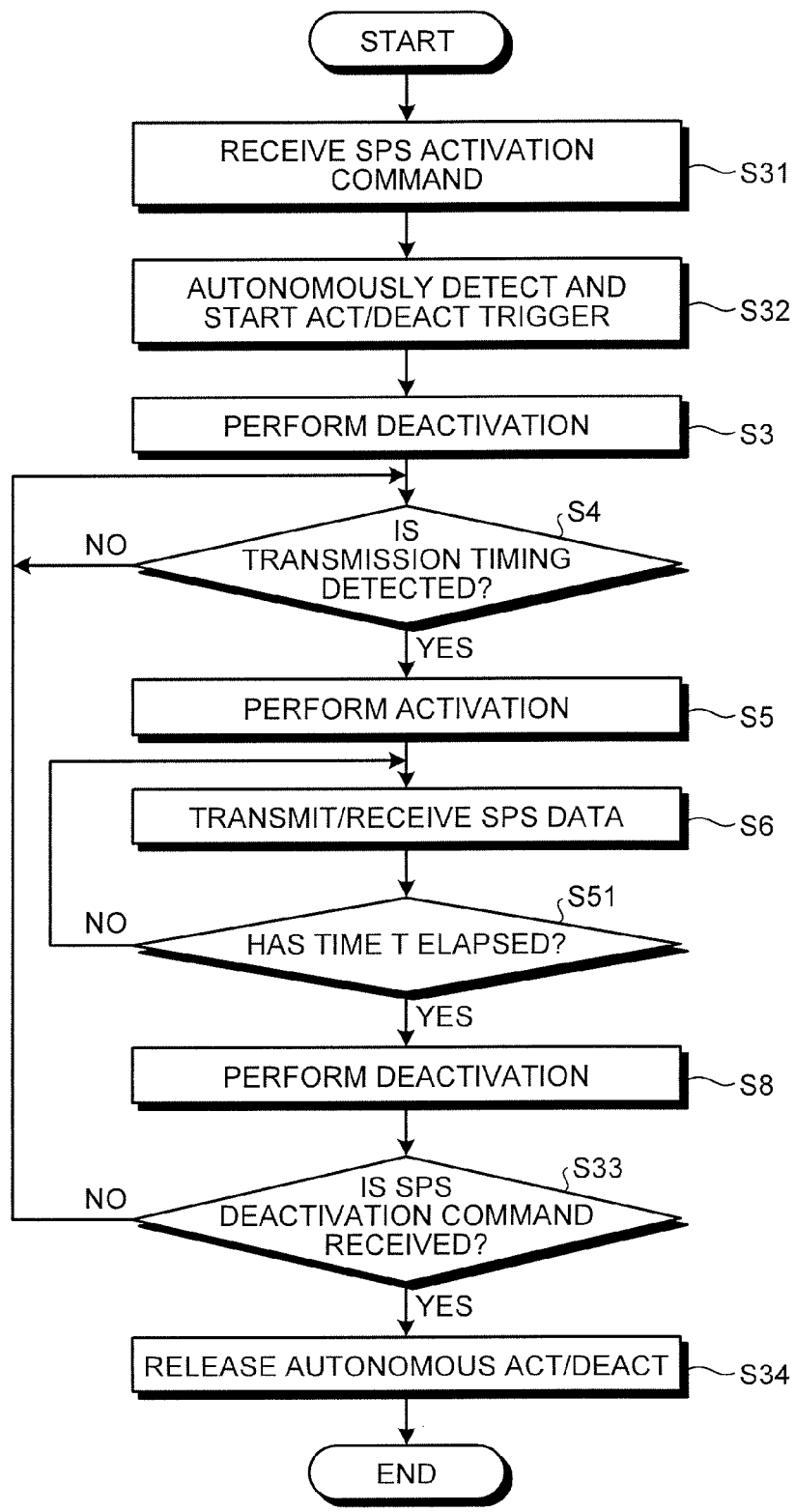
FIG. 26 is a flowchart illustrating an operation of the mobile station.
Figure 27:
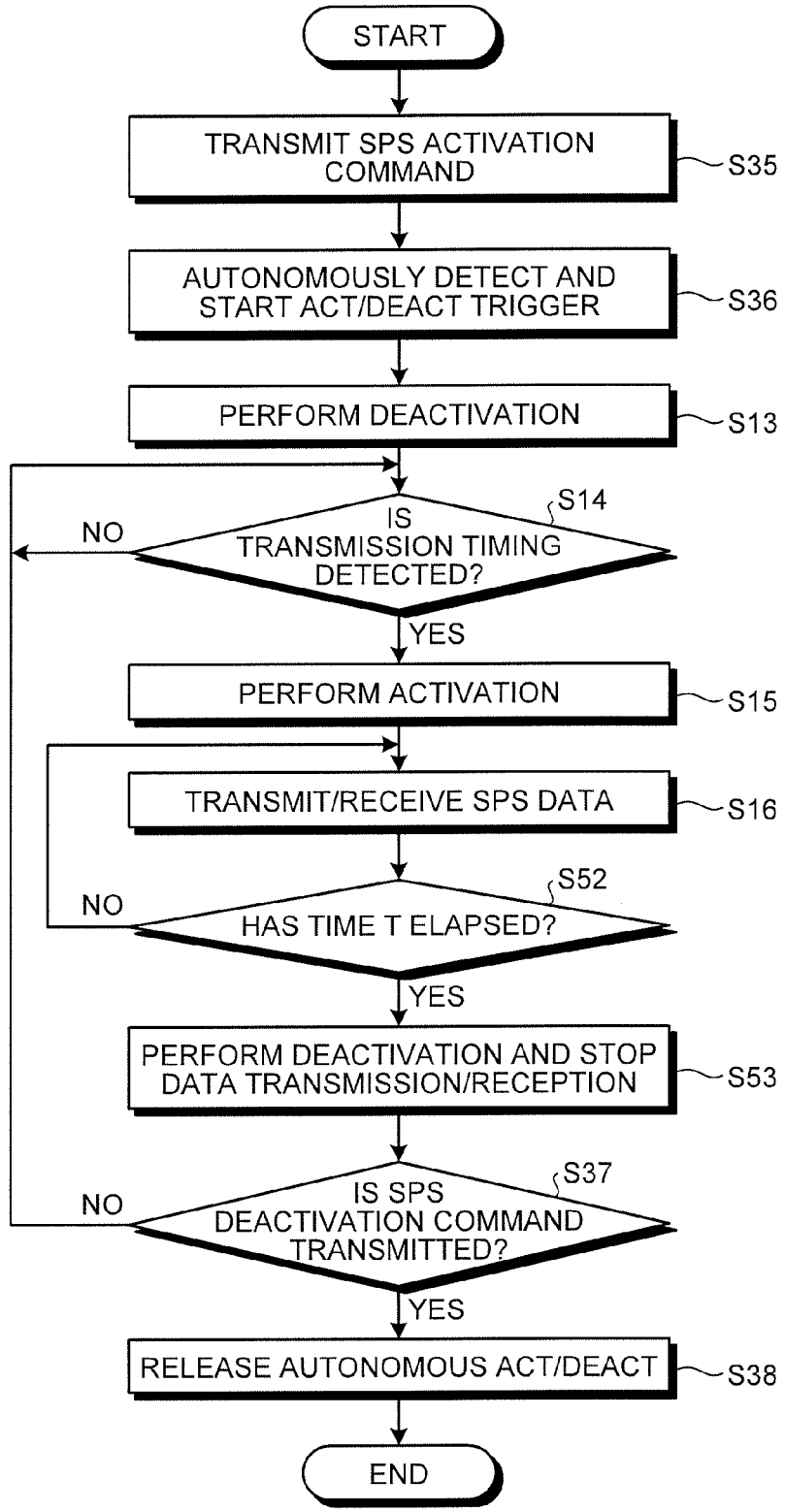
FIG. 27 is a flowchart illustrating an operation of the base station.

Operations of the base station and the mobile station to implement the wireless communication method of the present embodiment (a second method according to the second embodiment) will be explained below with reference to flowcharts. FIG. 26 is a flowchart illustrating an operation of the mobile station. FIG. 27 is a flowchart illustrating an operation of the base station.

In FIG. 26, the characteristic process illustrated in FIG. 24 is applied to the mobile station that operates as illustrated in FIG. 14. Specifically, the mobile station performs the process at S51 as described above instead of the process at S7 in FIG. 14.

In FIG. 27, the characteristic process illustrated in FIG. 25 is applied to the base station that operates as illustrated in FIG. 15. Specifically, the base station performs the processes at S52 and S53 as described above instead of the processes at S17 and S18 in FIG. 15.

By the control as described above, according to the second embodiment, it is possible to effectively save electric power even when the SCell contains the SPS data and other data.

[c] Third Embodiment

A wireless communication method according to a third embodiment will be explained below. In the third embodiment, it is assumed that the SPS data is served by "Dynamic Scheduling". The configurations of the mobile station and the base station are the same as those of the first embodiment. In the following, processes different from the first embodiment or the second embodiment will be explained.

Figure 28:
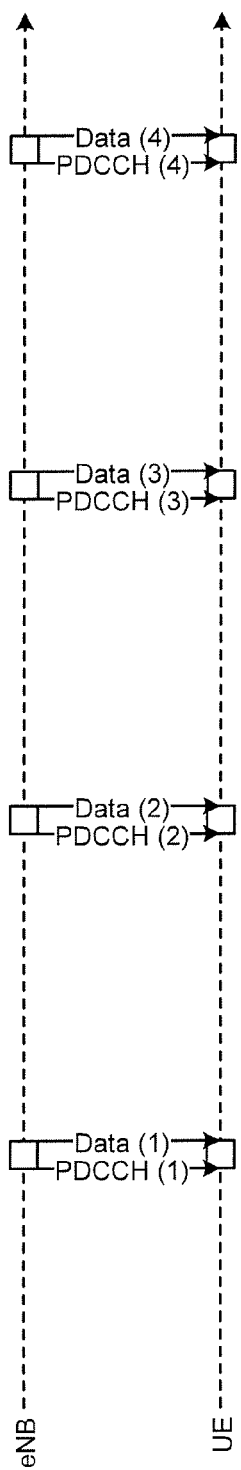
FIG. 28 is a diagram illustrating an example of "Dynamic Scheduling"

FIG. 28 is a diagram illustrating an example of the "Dynamic Scheduling". In the "Dynamic Scheduling", a radio resource being used is specified by a PDCCH in both of uplink and downlink communication. Therefore, when the SPS data is served by the "Dynamic Scheduling", for example, the base station performs "Dynamic Scheduling" at every 20 ms. Namely, specification and Data transmission by a PDCCH are repeated at every 20 ms (corresponding to PDCCH (1)→Data (1), PDCCH (2)→Data (2), PDCCH (3)→Data (3), PDCCH (4)→Data (4), . . . in FIG. 28).

Figure 29:
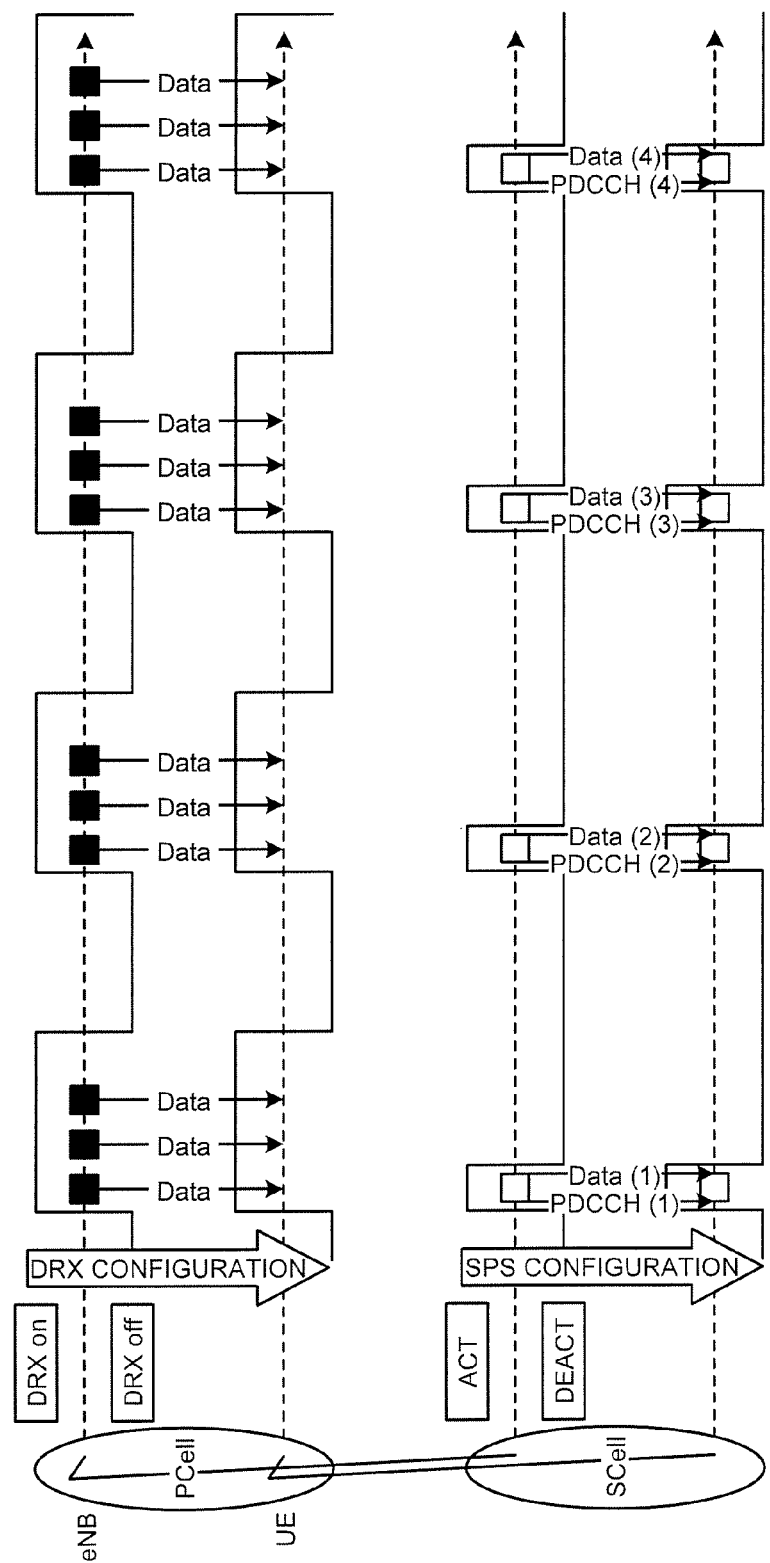
FIG. 29 is a diagram illustrating an example of a wireless communication method according to a third embodiment.

Therefore, in the present embodiment, the base station notifies the mobile station of an Activation/Deactivation pattern (ACT/DEACT pattern) in advance. FIG. 29 is a diagram illustrating an example of the wireless communication method according to the third embodiment. Upon receiving the Activation/Deactivation pattern, the mobile station determines that data is to be received at an Activation timing, and therefore autonomously performs Activation of the SCell and starts monitoring of a PDCCH. When successfully receiving the data, the mobile station performs Deactivation of the SCell. The mobile station repeats the above processes until the notified Activation/Deactivation pattern is completed. On the other hand, although not illustrated, when data reception has failed, the mobile station maintains the Activation of the SCell until the data is successfully received.

Figure 30:
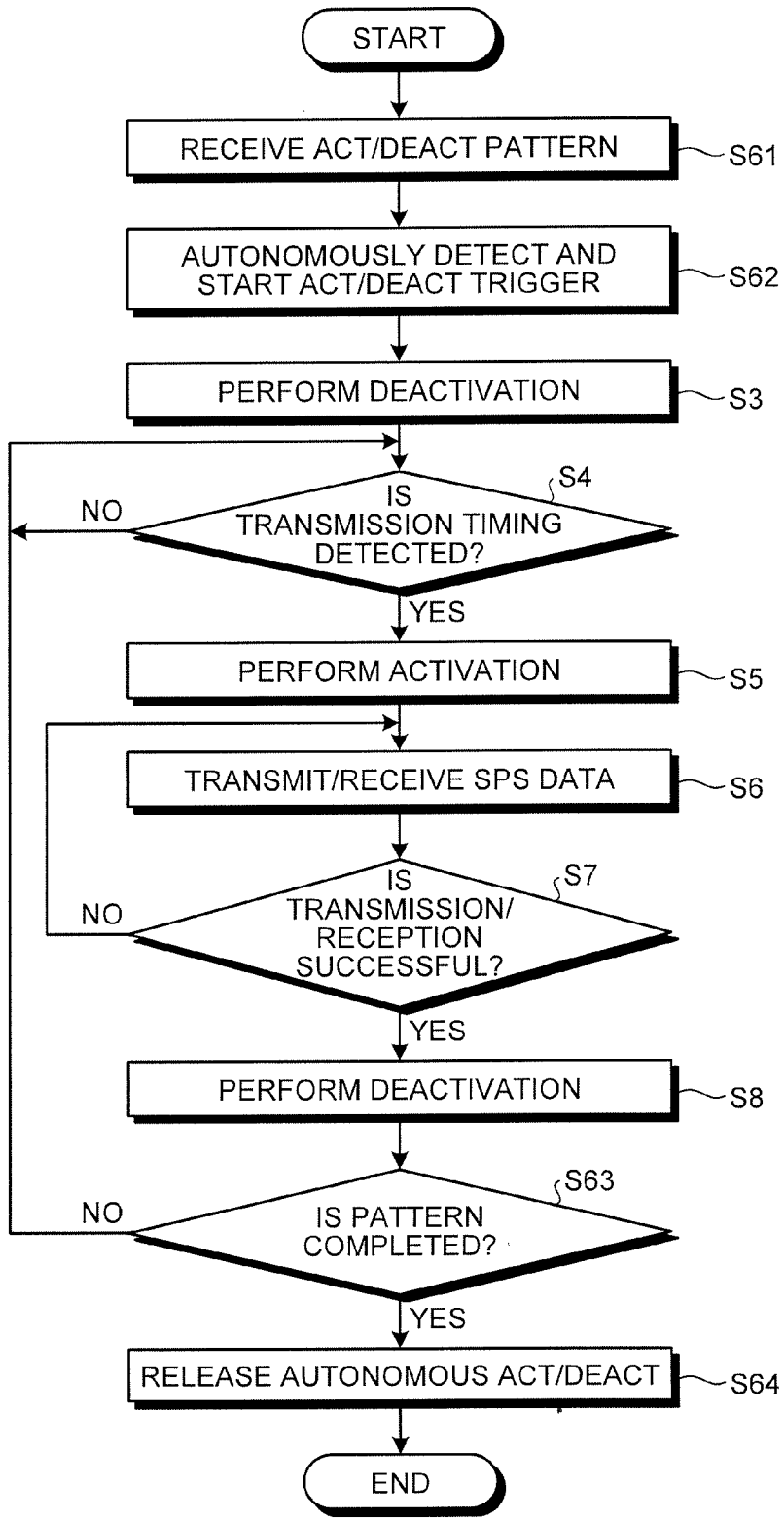
FIG. 30 is a flowchart illustrating an operation of the mobile station.
Figure 31:
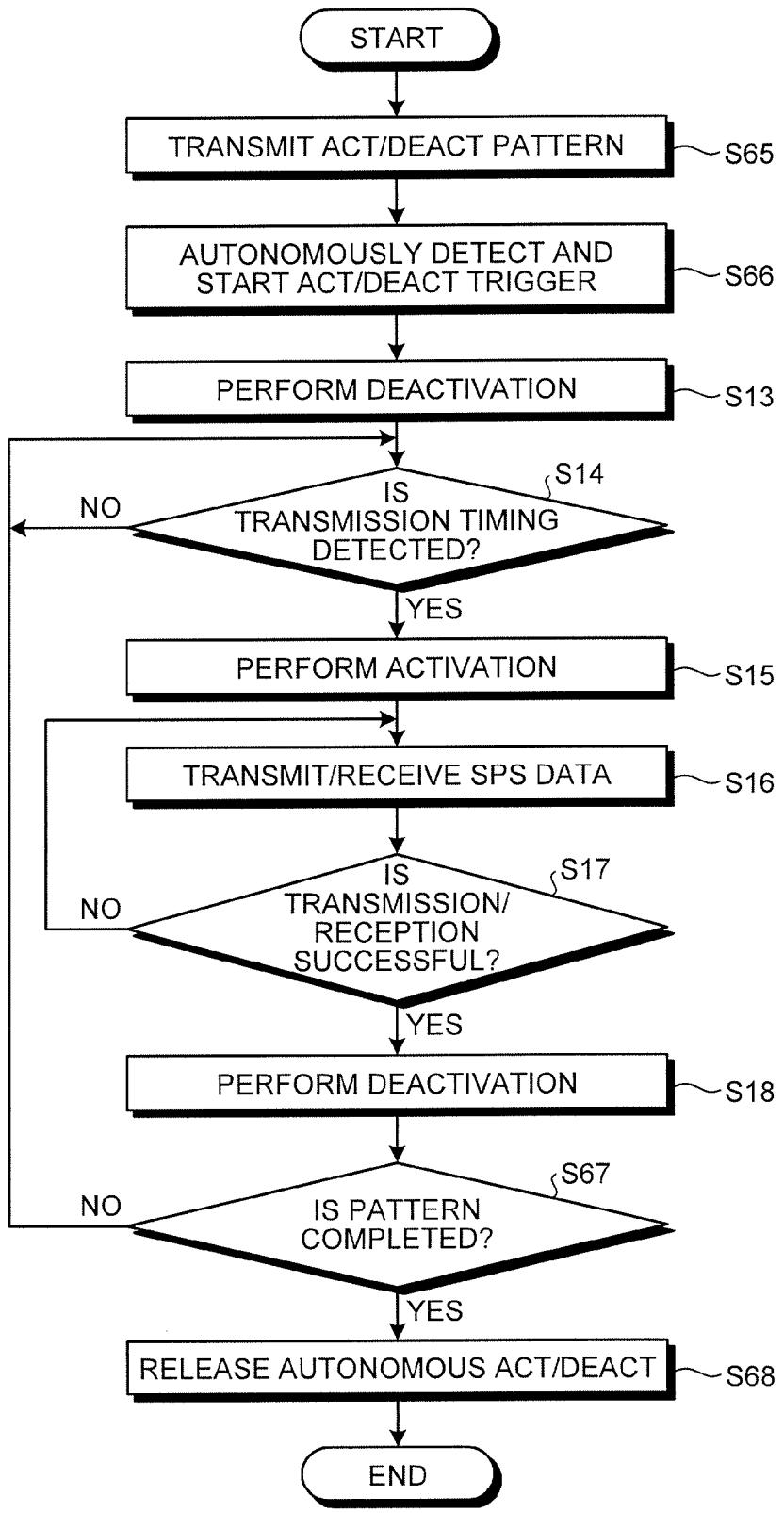
FIG. 31 is a flowchart illustrating an operation of the base station.

Operations of the base station and the mobile station to implement the wireless communication method of the present embodiment will be explained below with reference to flowcharts. FIG. 30 is a flowchart illustrating an operation of the mobile station. FIG. 31 is a flowchart illustrating an operation of the base station. The same processes as those of the first embodiment are denoted by the same step numbers (S), and the explanation thereof will be omitted. In the following, processes different from the first embodiment will be explained.

An operation of the mobile station will be explained below with reference to FIG. 30. When receiving an "ACT/DEACT pattern" transmitted via the transmitting/receiving unit 11 (S61), the transmission/reception control unit 34 notifies the SPS control unit 21 of the "ACT/DEACT pattern". Subsequently, the SPS control unit 21 controls processes related to the SPS communication. The ACT/DEACT managing unit 32 starts the autonomous Activation/Deactivation control at the reception timing of the "ACT/DEACT pattern" (S62). At the same time, the SPS transmission managing unit 31 starts a process for detecting a transmission timing of the SPS data as an "autonomous ACT/DEACT trigger" (S62).

After S8, until the "ACT/DEACT pattern" is completed (No at S63), the mobile station repeats the processes from S4 to S8 (the autonomous Activation/Deactivation control).

When detecting the completion of the "ACT/DEACT pattern" (Yes at S63), the transmission/reception control unit 34 notifies the SPS control unit 21 of the detection of the completion. The ACT/DEACT managing unit 32 terminates the autonomous Activation/Deactivation control at the timing of the completion of the "ACT/DEACT pattern", and at the same time, the SPS transmission managing unit 31 terminates the process for detecting the transmission timing of the SPS data (S64).

An operation of the base station will be explained below with reference to FIG. 31. In this example, the SPS control unit 51 controls processes related to the SPS communication. First, the transmission/reception control unit 64 transmits the "ACT/DEACT pattern" via the transmitting/receiving unit 43 (S65). The ACT/DEACT managing unit 62 starts the autonomous Activation/Deactivation control at the transmission timing of the "ACT/DEACT pattern" (S66). At the same time, the SPS transmission managing unit 61 starts a process for detecting a transmission timing of the SPS data as an "autonomous ACT/DEACT trigger" (S66).

After S18, until the "ACT/DEACT pattern" is completed (No at S67), the base station repeats the processes from S14 to S18 (the autonomous Activation/Deactivation control). When the transmission/reception control unit 64 detects completion of the "ACT/DEACT pattern" (Yes at S67), the ACT/DEACT managing unit 62 terminates the autonomous Activation/Deactivation control at the timing of the completion of the "ACT/DEACT pattern" (S68). At the same time, the SPS transmission managing unit 61 terminates the process for detecting the transmission timing of the SPS data (S68).

By the control as described above, according to the present embodiment, even when the SPS data is served by the "Dynamic Scheduling", it is possible to achieve the same advantageous effect as that of the first embodiment. Namely, the SCell does not perform monitoring of a PDCCH and buffering of a PDSCH in the Deactivation state. Therefore, it is possible to reduce waste of electric power compared with DRX, enabling to further save electric power.

Figure 32:
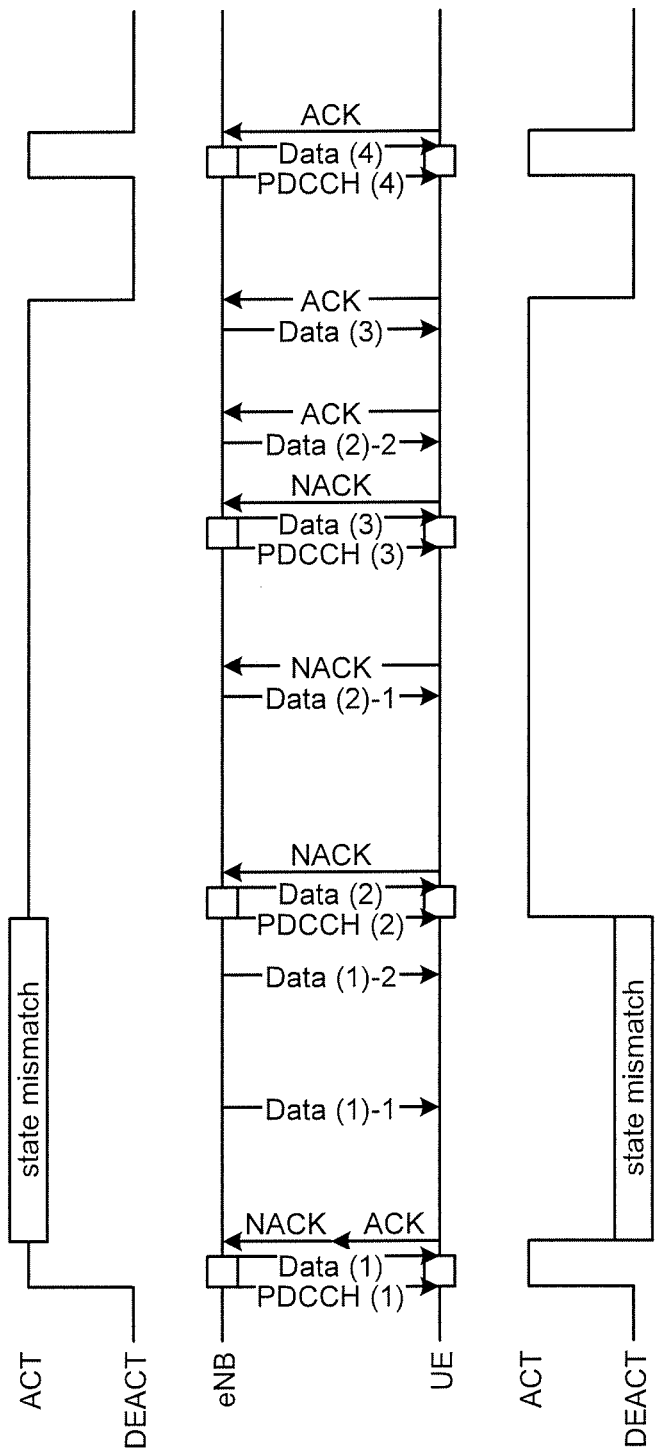
FIG. 32 is a diagram illustrating an example of an operation when the base station judges ACK as NACK.

In the present embodiment, for example, if an error occurs because the base station judges a reply as NACK even when the mobile station sends ACK, the mobile station and the base station perform operations as described below. FIG. 32 is a diagram illustrating an example of operations when the base station judges ACK as NACK. For example, when the mobile station receives Data (1) as SPS data and sends ACK as a reply, but if the base station judges the reply as NACK by error, the mobile station autonomously performs Deactivation of the SCell. Incidentally, because the base station has judged the reply as NACK, the base station maintains the Activation state of the SCell and continues retransmission of the Data (1) (Data (1)-1, Data (1)-2, . . . ). Namely, the state is inconsistent between the mobile station and the base station (state mismatch). In this case, the mobile station is in the Deactivation state and does not receive the retransmitted Data (1). However, because the mobile station has successfully received the Data (1), problems can hardly occur.

Figure 33:
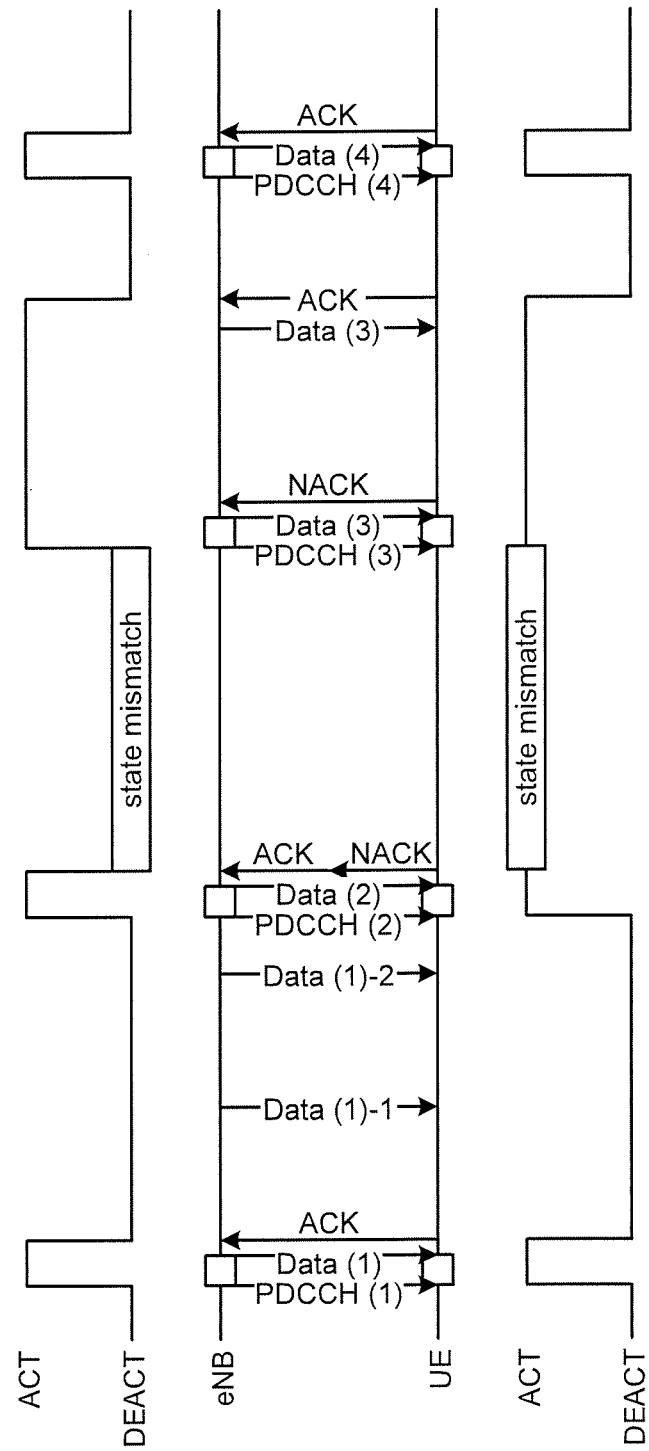
FIG. 33 is a diagram illustrating an example of an operation when the base station judges NACK as ACK.

Furthermore, in the present embodiment, for example, if an error occurs because the base station judges a reply as ACK even when the mobile station sends NACK, the mobile station and the base station perform operations as described below. FIG. 33 is a diagram illustrating an example of operations when the base station judges NACK as ACK. For example, when the mobile station receives Data (2) and sends NACK as a reply, but if the base station judges the reply as ACK by error, the mobile station autonomously continues Activation of the SCell. Incidentally, the base station enters the Deactivation state upon reception of ACK, and therefore, the base station does not retransmit the Data (2). Namely, the state is inconsistent between the mobile station and the base station (state mismatch). In this case, the mobile station loses the Data (2). However, such an error rarely occurs and can hardly cause a big problem.

[d] Fourth Embodiment

A wireless communication method according to a fourth embodiment will be explained below. In the fourth embodiment, it is assumed that the SPS data served by the "Dynamic Scheduling" and normal data served by the "Dynamic Scheduling" are mixed. The configurations of the mobile station and the base station are the same as those of the first embodiment. In the following, processes different from the processes of the third embodiment will be explained.

Figure 34:
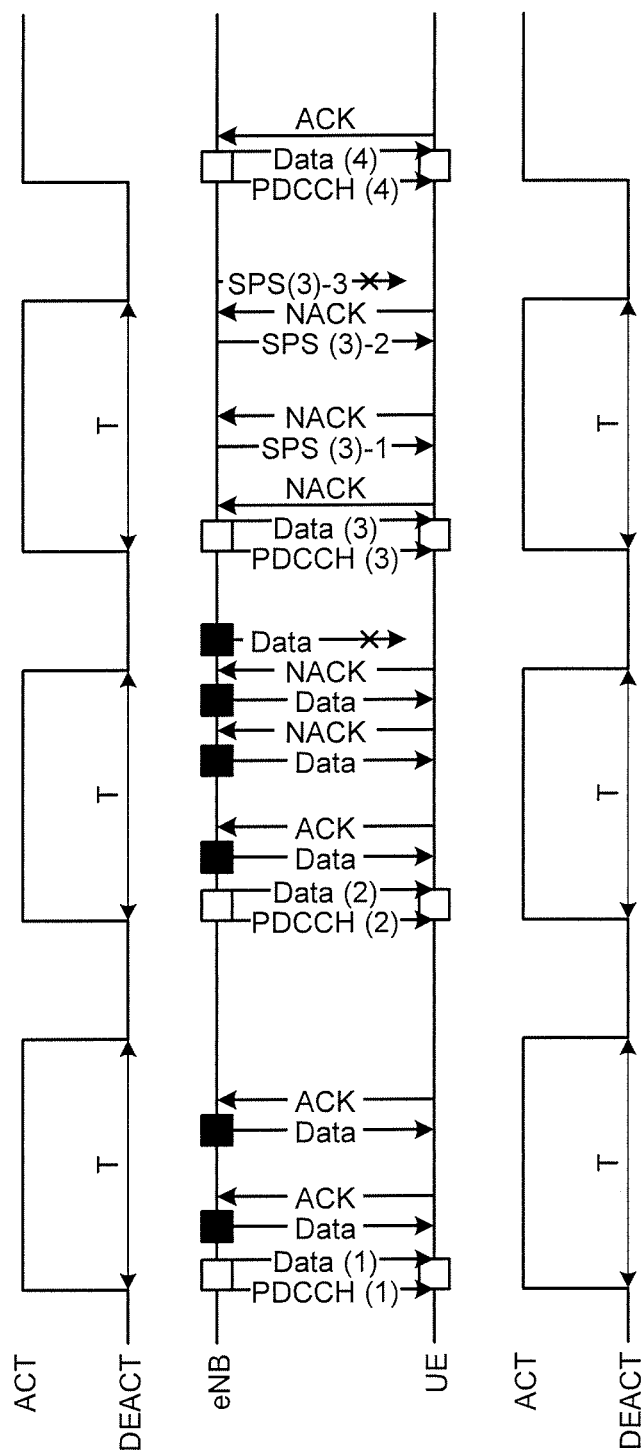
FIG. 34 is a diagram illustrating an example of a wireless communication method according to a fourth embodiment.

FIG. 34 is a diagram illustrating an example of the wireless communication method according to the fourth embodiment. In the present embodiment, the autonomous Activation control is the same as that of the third embodiment. Namely, the mobile station autonomously performs Activation of the SCell at the transmission timings of the SPS data (Data (1) to (4)). On the other hand, a timing for entering the Deactivation state is different from that of the third embodiment. In the third embodiment, the mobile station enters the Deactivation state at the timing at which transmission of the SPS data is completed (when the mobile station sends ACK as a reply). In the present embodiment, a timing for entering the Deactivation state is after a lapse of time T from a sub frame that has entered the Activation state. Namely, the mobile station autonomously performs Deactivation of the SCell at the sub frame after a lapse of the time T. Therefore, the base station needs to perform scheduling of the SPS data and normal data during this interval. If scheduling of data fails, the data is lost. The method to determined T is the same as that of the second embodiment.

Figure 35:
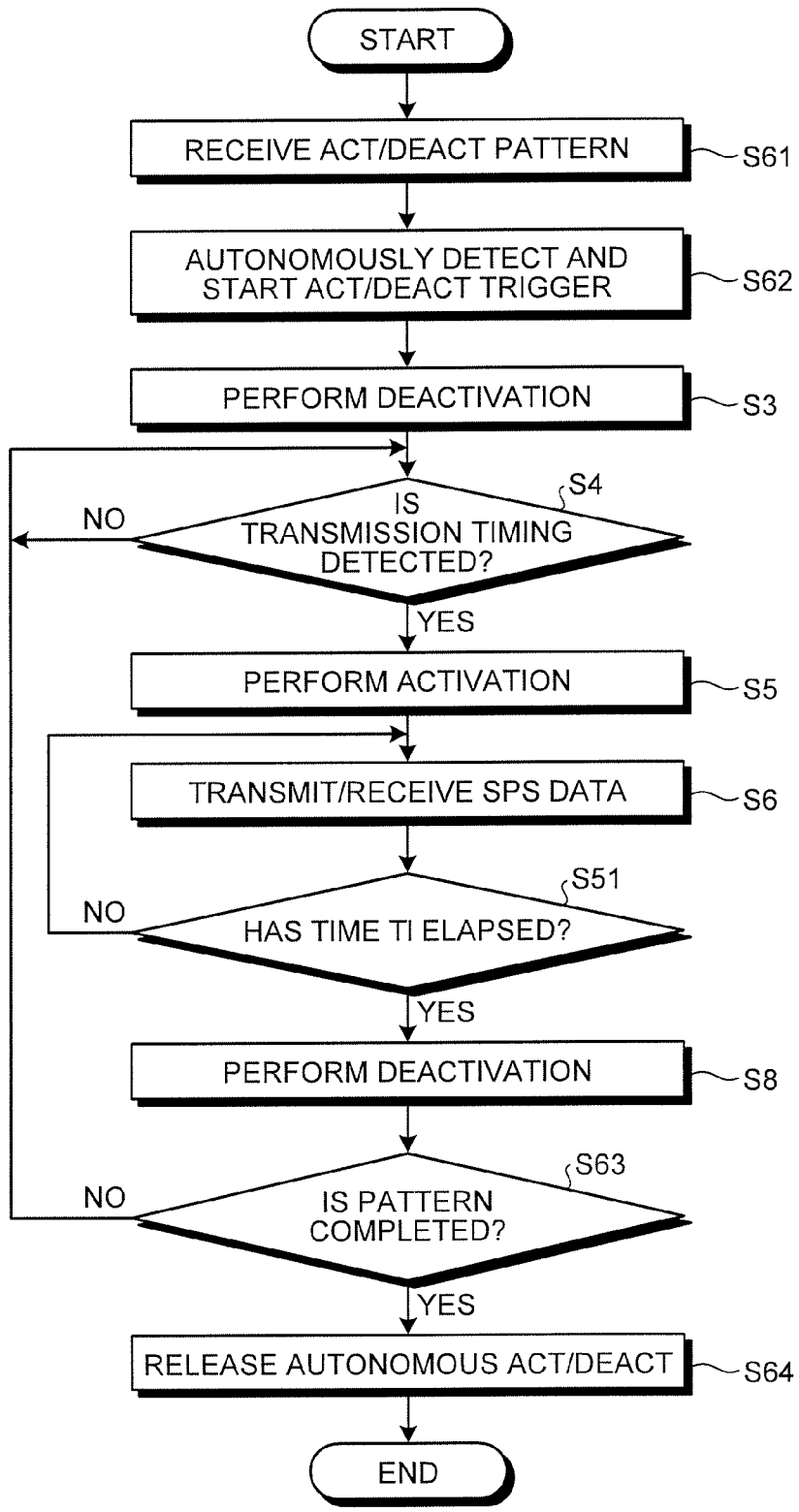
FIG. 35 is a flowchart illustrating an operation of the mobile station.
Figure 36:
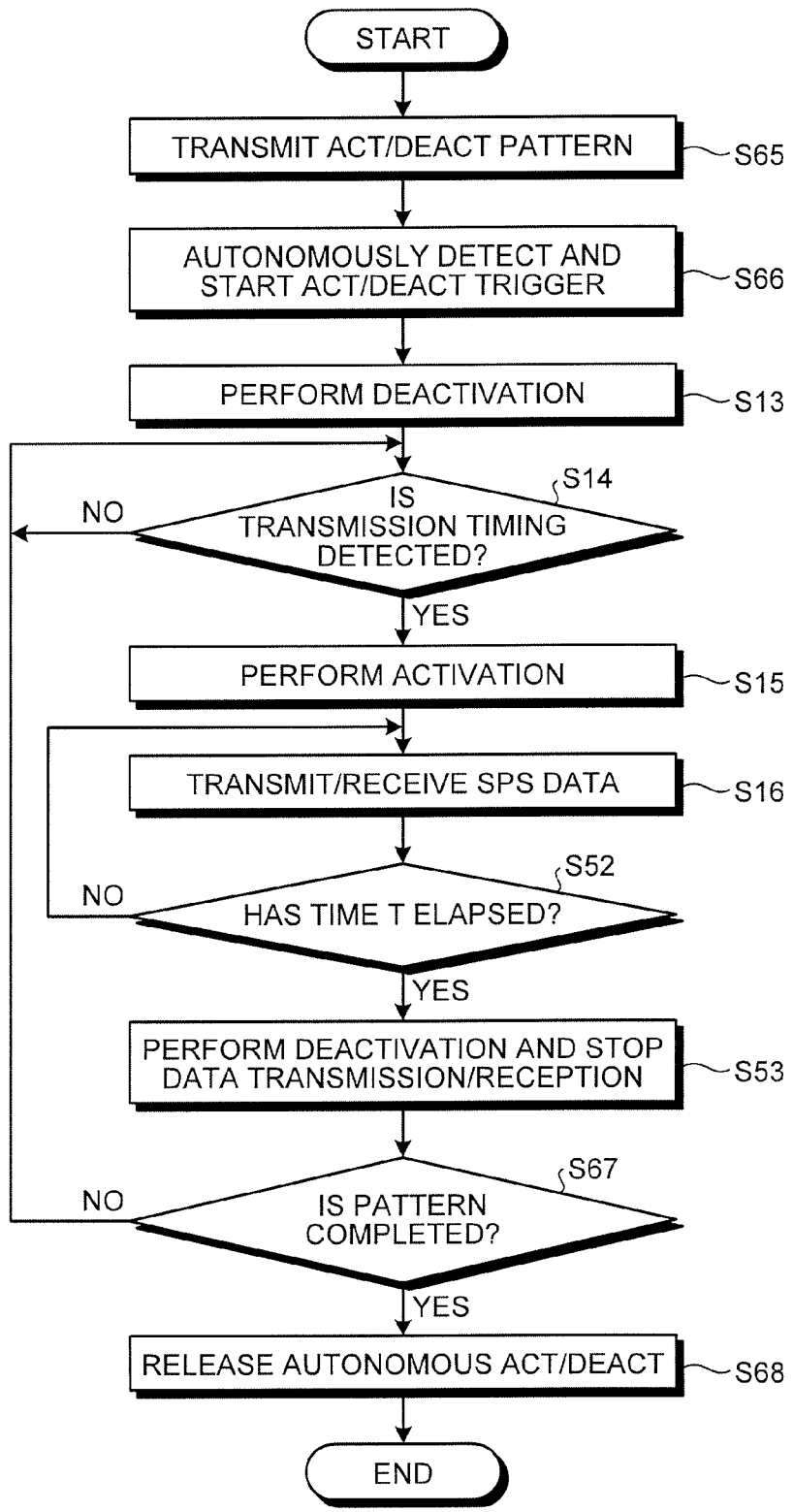
FIG. 36 is a flowchart illustrating an operation of the base station.

Operations of the base station and the mobile station to implement the wireless communication method according to the present embodiment will be explained with reference to flowcharts. FIG. 35 is a flowchart illustrating an operation of the mobile station. FIG. 36 is a flowchart illustrating an operation of the base station. The same processes as those of the third embodiment are denoted by the same reference step numbers (S), and the explanation thereof will be omitted. In the following, processes different from the processes of the third embodiment will be explained.

In FIG. 35, in the mobile station, after performing the process for transmitting and receiving the SPS data (S6), the SPS transmission managing unit 31 checks whether a time T has elapsed since Activation. Specifically, when the time T has not elapsed (No at S51), the SPS transmission managing unit 31 continues the process for transmitting and receiving the SPS data (S6). Thereafter, when the SPS transmission managing unit 31 determines that the time T has elapsed (Yes at S51), the ACT/DEACT managing unit 32 autonomously performs Deactivation of the SCell (S8).

In FIG. 36, in the base station, after performing the process for transmitting and receiving the SPS data (S16), the SPS transmission managing unit 61 checks whether the time T has elapsed since the Activation. Specifically, when the time T has not elapsed (No at S52), the SPS transmission managing unit 61 continues the process for transmitting and receiving the SPS data (S16). Thereafter, when the SPS transmission managing unit 61 determines that the time T has elapsed (Yes at S52), the ACT/DEACT managing unit 62 autonomously performs Deactivation of the SCell (S53), and stores (updates) the current state (Deactivation) of the SCell in the storage unit 22. The SPS transmission managing unit 61 stops the process for transmitting and receiving the SPS data (S53).

By the control as described above, according to the present embodiment, it is possible to effectively save electric power even when the SPS data served by the "Dynamic Scheduling" and normal data served by the "Dynamic Scheduling" are mixed.

According to an aspect of an embodiment of the mobile station disclosed in the present application, it is possible to reduce power consumption compared with a conventional system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile station configured to perform wireless communication by using a plurality of wireless carriers, discontinuous reception in which a first interval and a second interval are periodically repeated being applied to the mobile station, the first interval being an interval in which the mobile station monitors a control signal in a first wireless carrier of the plurality of wireless carriers, the second interval being an interval in which the mobile station does not involve monitoring the control signal in the first wireless carrier of the plurality of wireless carriers, the mobile station comprising:

a transmission managing unit configured to receive a configuration of a semi-persistent scheduling communication in a second wireless carrier which is different from the first wireless carrier of the plurality of wireless carriers, the semi-persistent scheduling communication being a communication in which communication data is transmitted and received using a radio resource which is periodically assigned, and to perform a first process in which the transmission managing unit detects a transmission timing of the communication data in the semi-persistent scheduling communication and a non-transmission timing of the communication data in the semi-persistent scheduling communication; and a state managing unit configured to control saving electric power of the second wireless carrier by performing a second process in which the state managing unit places the second wireless carrier in an activated state at the detected transmission timing of the communication data and by performing a third process in which the state managing unit makes the second wireless carrier a deactivated state at the detected non-transmission timing of the communication data, wherein the transmission managing unit and the state managing unit are configured to:

start the first, second, and third processes at a timing of receiving the configuration of the semi-persistent scheduling communication, repeat the first, second, and third processes before receiving a release notification of the semi-persistent scheduling communication, and terminate the first, second, and third processes at a timing of receiving the release notification of the semi-persistent scheduling communication.

2. The mobile station according to claim 1, wherein the state managing unit makes the second wireless carrier the deactivated state at a timing at which an acknowledgement (ACK) of the communication data is detected.

3. The mobile station according to claim 1, wherein the state managing unit makes the second wireless carrier the deactivated state at a timing when a predetermined time has elapsed since a start of the activation state.

4. The mobile station according to claim 1, wherein the communication data is transmitted by a specific pattern, and a radio resource is allocated to the predetermined wireless carrier at every transmission.

5. A base station that performs wireless communication by using a plurality of wireless carriers, discontinuous reception in which a first interval and a second interval are periodically repeated being applied to the base station, the first interval being an interval in which a mobile station monitors a control signal in a first wireless carrier of the plurality of wireless carriers, the second interval being an interval in which the mobile station does not involve monitoring the control signal in the first wireless carrier of the plurality of wireless carriers, the base station comprising:

a transmission managing unit configured to transmit a configuration of a semi-persistent scheduling communication in a second wireless carrier which is different from the first wireless carrier of the plurality of wireless carriers, the semi-persistent scheduling communication being a communication in which communication data is transmitted and received using a radio resource which is periodically assigned, and to perform a first process in which the transmission managing unit detects a transmission timing of the communication data in the semi-persistent scheduling communication and a non-transmission timing of the communication data in the semi-persistent scheduling communication; and a state managing unit that configured to control saving electric power of the second wireless carrier by performing a second process in which the state managing unit places the second wireless carrier in an activated state at the detected transmission timing of the communication data and by performing a third process in which the state managing unit makes the second wireless carrier a deactivated state at the detected non-transmission timing of the communication data, wherein the transmission managing unit and the state managing unit are configured to:

start the first, second, and third processes at a timing of transmitting the configuration of the semi-persistent scheduling communication, repeat the first, second and third processes before transmitting a release notification of the semi-persistent scheduling communication, and terminate the first, second and third processes at a timing of transmitting the release notification of the semi-persistent scheduling communication.

6. A wireless communication system configured to perform wireless communication by using a plurality of wireless carriers, discontinuous reception in which a first interval and a second interval are periodically repeated being applied to the wireless communication system, the first interval being an interval in which a mobile station monitors a control signal in a first wireless carrier of the plurality of wireless carriers, the second interval being an interval in which the mobile station does not involve monitoring the control signal in the first wireless carrier of the plurality of wireless carriers, the wireless communication system comprising:

the mobile station; and the base station, wherein the mobile station includes:

a transmission managing unit configured to receive a configuration of a semi-persistent scheduling communication in a second wireless carrier which is different from the first wireless carrier of the plurality of wireless carriers, the semi-persistent scheduling communication being a communication in which communication data is transmitted and received using a radio resource which is periodically assigned, and to perform a first process in which the transmission managing unit detects a transmission timing of the communication data in the semi-persistent scheduling communication and a non-transmission timing of the communication data in the semi-persistent scheduling communication; and a state managing unit configured to control saving electric power of the second wireless carrier by performing a second process in which the state managing unit makes the second wireless carrier an activated state at the detected transmission timing of the communication data and by performing a third process in which the state managing unit places the second wireless carrier in a deactivated state at the detected non-transmission timing of the communication data, wherein the transmission managing unit and the state managing unit are configured to:

start the first, second and third processes at a timing of receiving the configuration of the semi-persistent scheduling communication, repeat the first, second and third processes before receiving a release notification of the semi-persistent scheduling communication, and terminate the first, second and third processes at a timing of receiving the release notification of the semi-persistent scheduling communication.

7. A wireless communication method implemented by a wireless communication system that performs wireless communication by using a plurality of wireless carriers, discontinuous reception in which a first interval and a second interval are periodically repeated being applied to the wireless communication system, the first interval being an interval in which a mobile station monitors a control signal in a first wireless carrier of the plurality of wireless carriers, the second interval being an interval in which the mobile station does not involve monitoring the control signal in the first wireless carrier of the plurality of wireless carriers, the wireless communication method comprising:

at the mobile station of the wireless communication system, receiving a configuration of a semi-persistent scheduling communication in a second wireless carrier which is different to the first wireless carrier of the plurality of wireless carriers, the semi-persistent scheduling communication being a communication in which communication data is transmitted and received using a radio resource which is periodically assigned, and performing a first process in which the mobile station detects a transmission timing of the communication data in the semi-persistent scheduling communication and a non-transmission timing of the communication data in the semi-persistent scheduling communication; and at the mobile station, controlling saving electric power of the second wireless carrier by performing a second process in which the mobile station places the second wireless carrier in an activated state at the detected transmission timing of the communication data and by performing a third process in which the mobile station makes the second wireless carrier a deactivated state at the detected non-transmission timing of the communication data, wherein the mobile station is configured to:

start the first, second and third processes at a timing of receiving the configuration of the semi-persistent scheduling communication, repeat the first, second and third processes before receiving a release notification of the semi-persistent scheduling communication, and terminate the first, second and third processes at a timing of receiving the release notification of the semi-persistent scheduling communication.

8. The wireless communication method according to claim 7, wherein when wireless communication is performed by carrier aggregation, the second wireless carrier serves as a secondary cell.

* * * * *